US010735726B2

(12) United States Patent
Zhao et al.

(10) Patent No.: US 10,735,726 B2
(45) Date of Patent: Aug. 4, 2020

(54) APPARATUSES AND METHODS FOR ENCODING AND DECODING A VIDEO CODING BLOCK OF A VIDEO SIGNAL

(71) Applicant: Huawei Technologies Co., Ltd., Shenzhen (CN)

(72) Inventors: Zhijie Zhao, Munich (DE); Max Blaeser, Aachen (DE); Mathias Wien, Aachen (DE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/388,224

(22) Filed: Apr. 18, 2019

(65) Prior Publication Data

US 2019/0273920 A1 Sep. 5, 2019

Related U.S. Application Data

(63) Continuation of application No. PCT/EP2016/075131, filed on Oct. 19, 2016.

(51) Int. Cl.
| | |
|---|---|
| *H04N 19/117* | (2014.01) |
| *H04N 19/119* | (2014.01) |
| *H04N 19/139* | (2014.01) |
| *H04N 19/176* | (2014.01) |

(Continued)

(52) U.S. Cl.
CPC ......... *H04N 19/117* (2014.11); *H04N 19/119* (2014.11); *H04N 19/139* (2014.11);
(Continued)

(58) Field of Classification Search
None
See application file for complete search history.

(56) References Cited

U.S. PATENT DOCUMENTS

| 6,084,912 A | 7/2000 | Reitmeier et al. |
| 7,142,600 B1 | 11/2006 | Schonfeld et al. |

(Continued)

FOREIGN PATENT DOCUMENTS

| CN | 102763415 A | 10/2012 |
| EP | 1698164 | 9/2006 |

(Continued)

OTHER PUBLICATIONS

King, N., et al., "Advanced Video Coding:Principles and Techniques., Chapter 5, VOP Extraction and Tracking; Chapter 6, MPEG-4 Standard", XP002680736, Sep. 14, 1999, pp. 258-375.

(Continued)

*Primary Examiner* — Lindsay J Uhl
(74) *Attorney, Agent, or Firm* — Conley Rose, P.C.

(57) ABSTRACT

A decoding apparatus partitions a video coding block based on coding information into two or more segments including a first segment and a second segment. The coding information comprises a first segment motion vector associated with the first segment and a second segment motion vector associated with the second segment. A co-located first segment in a first reference frame is determined based on the first segment motion vector and a co-located second segment in a second reference frame is determined based on the second segment motion vector. A predicted video coding block is generated based on the co-located first segment and the co-located second segment. A divergence measure is determined based on the first segment motion vector and the second segment motion vector and a first or second filter is applied depending on the divergence measure to the predicted video coding block.

22 Claims, 13 Drawing Sheets

(51) Int. Cl.
*H04N 19/543* (2014.01)
*H04N 19/182* (2014.01)
*H04N 19/553* (2014.01)

(52) U.S. Cl.
CPC ......... *H04N 19/176* (2014.11); *H04N 19/182* (2014.11); *H04N 19/543* (2014.11); *H04N 19/553* (2014.11)

(56) References Cited

U.S. PATENT DOCUMENTS

| | | |
|---|---|---|
| 7,957,466 B2 | 6/2011 | Paniconi et al. |
| 8,086,036 B2 | 12/2011 | Senior |
| 2005/0135700 A1 | 6/2005 | Anderson |
| 2011/0200097 A1* | 8/2011 | Chen ................ H04N 19/52 375/240.02 |
| 2012/0170659 A1 | 7/2012 | Chaudhury et al. |
| 2014/0034823 A1 | 2/2014 | Hyde-Barber |
| 2017/0201770 A1 | 7/2017 | Chen et al. |

FOREIGN PATENT DOCUMENTS

| | | |
|---|---|---|
| WO | 2008150113 A1 | 12/2008 |
| WO | 2015200820 A1 | 12/2015 |

OTHER PUBLICATIONS

List, P., et al., "Adaptive Deblocking Filter," XP011221094, IEEE Transactions on Circuits and Systems for Video Technology, vol. 13, No. 7, Jul. 2003, pp. 614-619.

ITU-T H.264, "Series H: Audiovisual and Multimedia Systems, Infrastructure of audiovisual services—Coding of moving video, Advanced video coding for generic audiovisual services," Feb. 2016, 807 pages.

Foreign Communication From a Counterpart Application, PCT Application No. PCT/EP2016/075131, English Translation of International Search Report dated Jul. 13, 2017, 6 pages.

Foreign Communication From a Counterpart Application, PCT Application No. PCT/EP2016/075131, English Translation of Written Opinion dated Jul. 13, 2017, 11 pages.

Foreign Communication From a Counterpart Application, Chinese Application No. 2016800902718, Chinese Search Report dated Dec. 2, 2019, 2 pages.

Foreign Communication From a Counterpart Application, Chinese Application No. 2016800902718, Chinese Office Action dated Dec. 11, 2019, 6 pages.

\* cited by examiner

APPARATUSES AND METHODS FOR ENCODING AND DECODING A VIDEO CODING BLOCK OF A VIDEO SIGNAL

CROSS-REFERENCE TO RELATED APPLICATIONS

This application is a continuation application of International Application No. PCT/EP2016/075131, filed on Oct. 19, 2016, the disclosure of which is hereby incorporated by reference in its entirety.

TECHNICAL FIELD

Generally, the present disclosure relates to the field of video coding. More specifically, the present disclosure relates to apparatuses and methods for encoding and decoding a video coding block of a video signal using segmentation based partitioning for inter prediction of the video coding block.

BACKGROUND

In current video coding schemes, such as H.264/AVC ("Advanced Video Coding") or HEVC ("High Efficiency Video Coding"), the motion information in inter-predicted pictures (also referred to as frames) is partitioned into rectangular video coding blocks of configurable size. While in H.264/AVC the motion is partitioned into symmetric video coding blocks with a maximum size of 16×16 pixels, so-called macroblocks, which can be further subdivided down to a minimum of 4×4 pixels, HEVC replaces a macroblock with a coding tree unit (CTU) of maximum size 64×64 pixels. The CTU is not just a larger macroblock, as it can be partitioned in a quadtree (QT) decomposition scheme into smaller coding units (CU), which, in turn, can be subdivided down to a minimum size of 8×8 pixels. Furthermore, in comparison to H.264/AVC additionally HEVC supports asymmetric block partitioning (AMP) of coding units (CU) into prediction units (PU).

The determination of the decomposition and partitioning of each CTU is performed during the encoding process and is based on a rate-distortion optimization criterion. While AMP already provides an improved coding efficiency, problems in coding efficiency may arise along the boundaries of moving objects in a video sequence. Object boundaries that are not strictly vertical or horizontal may result in a fine quadtree decomposition and block partitioning along the object boundary. As the blocks along the boundary are expected to contain similar motion information, redundancy is introduced, which decreases the coding efficiency.

An attempt to address this problem is called geometric motion partitioning (GMP), which is based on the idea of partitioning a rectangular video coding block into two segments via a straight line, which can have practically any orientation. This approach provides for more flexibility in motion partitioning and therefore leads to a closer approximation of the actual motion. However, finding the optimal GMP of a video coding block in an exhaustive search, which greatly increases the computational complexity. Moreover, an efficient predictive coding scheme for the additional GMP information has to be provided.

In a more general and advanced partitioning approach, the video coding block containing an object boundary is partitioned into two (or more) segments along the actual object boundary, where the two or more segments carry coherent, yet different motion information. Due to the possible complexity of the shape of the boundary, coding the boundary and transmitting it as side information to the decoder is generally not an efficient option in terms of the data rate. This problem can be solved by determining the object boundary at the decoder (and encoder) side using already available information, e.g. from available reference pictures. Finding the correct object boundary is a typical problem in the field of image segmentation. Segmentation can be performed according to numerous image features, such as pixel luminance, chrominance, texture or a combination thereof.

In general, block based inter prediction methods used in today's common video codecs, such as AVC and HEVC, do not provide a consistent solution to address the problem of occlusions, which occurs when overlapping objects within a video sequence move into different directions. For instance, in a video sequence, where a foreground object moves to the lower right at high velocity, while a background object moves to the right at low velocity, new content will be uncovered at the left side of the boundary between foreground and background. Accordingly, at other regions in the video sequence, existing background will be covered by moving foreground objects.

In general, regions of the video sequence, where motion vectors of neighboring objects converge, typically result in a fine block partitioning along the object boundary. All blocks on one side of the boundary exhibit the same motion, thus introducing unnecessary overhead in terms of signaling this motion to the decoder. Furthermore, in regions where motion vectors diverge, new content is being uncovered, which cannot easily be predicted, neither through inter- nor intra-prediction methods.

U.S. Pat. No. 7,142,600 discloses a method of detecting occlusions and disocclusions based on k-means clustering, where an average motion vector of a suspect region is compared to a centroid motion vector and the difference between these two vectors is used in a subsequent threshold based decision process to detect the occlusion.

Although the approach described in U.S. Pat. No. 7,142,600 provides some improvements with respect to the handling of occlusions and disocclusions compared to other approaches, there is still a need for video coding devices and methods, which are based on segmentation-based partitioning for inter prediction of a video coding block and which provide an improved handling of occlusions and disocclusions.

SUMMARY

It is an object to provide video coding devices and methods, which are based on segmentation-based partitioning for inter prediction of a video coding block and which provide an improved handling of occlusions and disocclusions.

The foregoing and other objects are achieved by the subject matter of the independent claims. Further implementation forms are apparent from the dependent claims, the description and the figures.

In order to describe embodiments of the disclosure in detail, the following terms, abbreviations and notations will be used:

HEVC High-Efficiency Video Coding
CU Coding Unit
CTU Coding Tree Unit
PU Prediction Unit
PB Prediction Block
MV Motion Vector
GMP Geometric Motion Partitioning SBP Segmentation Based Partitioning AMP Asymmetric Motion Partitioning As used herein, a video signal or video sequence is a set of subsequent frames presenting a motion picture. In other words, a video signal or video sequence consists of a plurality of frames (also referred to as pictures or images).

As used herein, segmentation is the process of partitioning a picture or picture region, in particular a video coding block, into two or more segments or partitions.

As used herein, coding tree unit (CTU) denotes the root of a coding structure of the video sequence of a pre-defined size, containing a part of a frame (e.g. 64×64 pixels). A CTU can be partitioned into several CUs.

As used herein, coding unit (CU) denotes a basic coding structure of the video sequence of a pre-defined size, containing a part of a frame, which is belonging to a CTU. A CU can be partitioned into further CUs.

As used herein, prediction unit (PU) denotes a coding structure, which is the result of partitioning of a CU.

The devices and method described herein may be used for representing motion information for segmentation based block partitioning, used in conjunction with rectangular block partitioning, which is useful for inter-prediction in video coding applications.

The devices and methods described herein may be used for inter-prediction between pictures to exploit the temporal redundancy of natural video sequences. The change of information observed between the current picture and a reference picture can often be approximated by translational movement, e.g. linear movement within the image plane. Block based motion compensation is the dominating realisation of this paradigm, where a reference picture is partitioned into rectangular blocks and each pixel within a block is exhibiting the same motion. Thus, the movement of the entire block, called the prediction block, can be described by a single motion vector. The set of motion vectors over the whole reference picture defined a vector field, which is denoted as a motion vector field.

According to a first aspect the disclosure relates to a decoding apparatus for decoding a video coding block of a current frame of an encoded video signal, wherein the encoded video signal comprises coding information (herein also referred to as side information or coding parameters) and a plurality of frames and wherein each frame is dividable into a plurality of video coding blocks. The decoding apparatus comprises: a decoding unit configured to decode the video coding block for providing a residual video coding block; a segmentation based partitioning unit configured to partition the video coding block on the basis of the coding information into two or more segments including a first segment and a second segment, wherein the coding information comprises a first segment motion vector associated with the first segment of the video coding block and a second segment motion vector associated with the second segment of the video coding block; an inter prediction unit configured to determine on the basis of the first segment motion vector a co-located first segment in a first reference frame and on the basis of the second segment motion vector a co-located second segment in a second reference frame and to generate a motion-compensated predicted video coding block on the basis of the co-located first segment and the co-located second segment and the first segment motion vector and the second segment motion vector, wherein the predicted video coding block comprises a predicted first segment and a predicted second segment; a motion-dependent filtering unit configured to determine a divergence measure on the basis of the first segment motion vector and the second segment motion vector and to apply depending on the divergence measure a first filter or a second filter to the predicted video coding block; and a reconstruction unit configured to reconstruct the video coding block on the basis of the filtered predicted video coding block and the residual video coding block.

Thus, a decoding apparatus is provided, which is based on segmentation-based partitioning for inter prediction of a video coding block and which provides an improved handling of occlusions and disocclusions. In particular, the decoding apparatus allows depending on a divergence measure, which indicates the divergence or the convergence of the first and second segment motion vectors, to apply different filters to the segments. Applying different motion-dependent filters to the segments has the advantage of allowing an improved handling of occlusions and disocclusions during the inter prediction process and, therefore, improves the coding efficiency of the decoding apparatus.

In a first possible implementation form of the decoding apparatus according to the first aspect as such, the motion-dependent filtering unit is configured to apply the first filter to a boundary between the predicted first segment and the predicted second segment of the predicted video coding block, in case the divergence measure indicates that the first segment motion vector and the second segment motion vector are diverging, wherein the first filter comprises a directional smoothing filter for smoothing across the boundary between the predicted first segment and the predicted second segment.

By providing a first filter in the form of a smoothing filter the effects of a disocclusion can be mitigated and the prediction error can be reduced, therefore, the coding efficiency can be improved.

In a second possible implementation form of the decoding apparatus according to the first implementation form of the first aspect, the motion-dependent filtering unit is configured to adjust a filter property of the first filter on the basis of the divergence measure, or on the basis of the first segment motion vector and the second segment motion vector, or on the basis of a difference between pixel values of pixels located at the boundary between the predicted first segment and the predicted second segment, wherein the filter property of the first filter comprises a first filter strength or a first filter size of the first filter.

Thus, properties of the first filter, such as a first filter strength, can be adapted to the strength of the divergence of the segment motion vectors and in this way, first filters with different strengths or sizes can be adapted to different environments in which embodiments of the present disclosure is applied, and the flexibility of selecting the first filter can be achieved, thereby, the coding efficiency can be improved.

In a third possible implementation form of the decoding apparatus according to the first aspect as such or the first or second implementation form thereof, the motion-dependent filtering unit is configured to determine whether the predicted first segment or the predicted second segment is a background segment on the basis of the coding information, wherein the coding information comprises information about whether the predicted first segment or the predicted second segment is a background segment or information about whether the predicted first segment or the predicted second segment is a foreground segment.

In a fourth possible implementation form of the decoding apparatus according to the third implementation form of the first aspect, the motion-dependent filtering unit is further configured to apply the second filter to the predicted video coding block, in case the divergence measure indicates that the first segment motion vector and the second segment motion vector are converging, wherein the second filter comprises a feathering filter for feathering in the direction of the background segment or in the opposite direction of the foreground segment.

By providing a second filter in the form of a feathering filter the effects of an occlusion can be mitigated and the prediction error can be reduced, therefore, the coding efficiency can be improved.

In a fifth possible implementation form of the decoding apparatus according to the third or fourth implementation form of the first aspect, the motion-dependent filtering unit is configured to adjust a filter property of the second filter on the basis of the divergence measure, wherein the filter property of the second filter comprises a second filter strength or a second filter size of the second filter.

Thus, properties of the second filter, such as a second filter strength, can be adapted to the strength of the convergence of the segment motion vectors and in this way, second filters with different strengths or sizes can be adapted to different environments in which embodiments of the present disclosure is applied, and the flexibility of selecting the second filter can be achieved, thereby, the coding efficiency can be improved.

In a sixth possible implementation form of the decoding apparatus according to the first aspect as such or any one of the first to fifth implementation form thereof, the first segment motion vector and the second segment motion vector define a vector field, wherein the motion-dependent filtering unit is configured to determine the divergence measure on the basis of the first segment motion vector and the second segment motion vector as the divergence of the vector field, and wherein the divergence of the vector field being smaller than a first threshold value indicates that the first segment motion vector and the second segment motion vector are converging and wherein the divergence of the vector field being larger than the first threshold value indicates that the first segment motion vector and the second segment motion vector are diverging. In an implementation form, the first threshold value may be zero.

The divergence of the motion vector field defined by the first and second segment motion vectors provides an efficient divergence measure of the first and second segment motion vectors. In an implementation form, a discretized version of the divergence operator based on finite differences can be used to determine the divergence of the motion vector field defined by the first and second segment motion vectors in an efficient manner.

According to a second aspect the disclosure relates to a corresponding method of decoding a video coding block of a current frame of an encoded video signal, wherein the encoded video signal comprises coding information and a plurality of frames, wherein each frame is dividable into a plurality of video coding blocks. The decoding method comprises the steps of: providing a residual video coding block by decoding the video coding block; partitioning the video coding block on the basis of the coding information into two or more segments including a first segment and a second segment, wherein the coding information comprises a first segment motion vector associated with the first segment of the video coding block and a second segment motion vector associated with the second segment of the video coding block; determining on the basis of the first segment motion vector a co-located first segment in a first reference frame and on the basis of the second segment motion vector a co-located second segment in a second reference frame; generating a motion-compensated predicted video coding block on the basis of the co-located first segment and the co-located second segment, wherein the predicted video coding block comprises a predicted first segment and a predicted second segment; determining a divergence measure on the basis of the first segment motion vector and the second segment motion vector; applying depending on the divergence measure a first filter or a second filter to the predicted video coding block; and reconstructing the video coding block on the basis of the filtered predicted video coding block and the residual video coding block.

Thus, a decoding method is provided, which is based on segmentation-based partitioning for inter prediction of a video coding block and which provides an improved handling of occlusions and disocclusions. In particular, the decoding method allows depending on a divergence measure, which indicates the divergence or the convergence of the first and second segment motion vectors, to apply different filters to the segments. Applying different motion-dependent filters to the segments has the advantage of allowing an improved handling of occlusions and disocclusions during the inter prediction process and, therefore, improves the coding efficiency of the decoding apparatus.

In a first possible implementation form of the decoding method according to the second aspect as such, the step of applying depending on the divergence measure a first filter or a second filter to the predicted video coding block comprises applying the first filter to a boundary between the predicted first segment and the predicted second segment of the predicted video coding block, in case the divergence measure indicates that the first segment motion vector and the second segment motion vector are diverging, wherein the first filter comprises a directional smoothing filter for smoothing across the boundary between the predicted first segment and the predicted second segment.

By providing a first filter in the form of a smoothing filter the negative effects of a disocclusion can be mitigated and the prediction error can be reduced, which, in turn, improves the coding efficiency.

In a second possible implementation form of the decoding method according to the first implementation form of the second aspect, the decoding method comprises the further step of adjusting a filter property of the first filter on the basis of the divergence measure, or on the basis of the first segment motion vector and the second segment motion vector, or on the basis of a difference between pixel values of pixels located at the boundary between the predicted first segment and the predicted second segment, wherein the filter property of the first filter comprises a first filter strength or a first filter size of the first filter.

Thus, properties of the first filter, such as a first filter strength or size, can be adapted to the strength of the divergence. i.e. the strength of a disocclusion, and in this way the size and/or strength of the first filter can be adapted to different video coding scenarios, thereby improving the coding efficiency.

In a third possible implementation form of the decoding method according to the second aspect as such or the first or second implementation form thereof, the decoding method comprises the further step of determining whether the predicted first segment or the predicted second segment is a background segment on the basis of the coding information, wherein the coding information comprises information about whether the predicted first segment or the predicted second segment is a background segment or information about whether the predicted first segment or the predicted second segment is a foreground segment.

In a fourth possible implementation form of the decoding method according to the third implementation form of the second aspect, the step of applying depending on the divergence measure a first filter or a second filter to the predicted video coding block comprises applying the second filter to the predicted video coding block, in case the divergence measure indicates that the first segment motion vector and the second segment motion vector are converging, wherein the second filter comprises a feathering filter for feathering in the direction of the background segment or in the opposite direction of the foreground segment.

By providing a second filter in the form of a feathering filter the effects of an occlusion can be mitigated and the prediction error can be reduced, therefore, the coding efficiency can be improved.

In a fifth possible implementation form of the decoding method according to the third or fourth implementation form of the second aspect, the decoding method comprises the further step of adjusting a filter property of the second filter on the basis of the divergence measure, wherein the filter property of the second filter comprises a second filter strength or a second filter size of the second filter.

Thus, properties of the second filter, such as a second filter strength or size, can be adapted to the strength of the divergence, i.e. the strength of an occlusion, and in this way the size and/or strength of the second filter can be adapted to different video coding scenarios, thereby improving the coding efficiency.

In a sixth possible implementation form of the decoding method according to the second aspect as such or any one of the first to fifth implementation form thereof, the first segment motion vector and the second segment motion vector define a vector field, wherein the step of determining a divergence measure on the basis of the first segment motion vector and the second segment motion vector comprises the step of determining the divergence measure on the basis of the first segment motion vector and the second segment motion vector as the divergence of the vector field, wherein the divergence of the vector field being smaller than a first threshold value indicates that the first segment motion vector and the second segment motion vector are converging and wherein the divergence of the vector field being larger than the first threshold value indicates that the first segment motion vector and the second segment motion vector are diverging. In an implementation form, the first threshold value is zero.

The divergence of the motion vector field defined by the first and second segment motion vectors provides an efficient divergence measure of the first and second segment motion vectors. In an implementation form, a discretized version of the divergence operator based on finite differences can be used to determine the divergence of the motion vector field defined by the first and second segment motion vectors in an efficient manner.

According to a third aspect the disclosure relates to an encoding apparatus for encoding a video coding block of a current frame of a video signal, wherein the video signal comprises a plurality of frames and each frame is dividable into a plurality of video coding blocks. The encoding apparatus comprises: a segmentation based partitioning unit configured to partition the video coding block into two or more segments including a first segment and a second segment; an inter prediction unit configured to determine a co-located first segment in a first reference frame of the video signal and a co-located second segment in a second reference frame of the video signal, wherein the first segment and the co-located first segment define a first segment motion vector and wherein the second segment and the co-located second segment define a second segment motion vector, and to generate a motion-compensated predicted video coding block on the basis of the co-located first segment and the co-located second segment and the first segment motion vector and the second segment motion vector, wherein the predicted video coding block comprises a predicted first segment and a predicted second segment; a motion-dependent filtering unit configured to determine a divergence measure on the basis of the first segment motion vector and the second segment motion vector and to apply depending on the divergence measure a first filter or a second filter to the predicted video coding block; and an encoding unit configured to generate an encoded video coding block on the basis of the filtered predicted video coding block.

Thus, an encoding apparatus is provided, which is based on segmentation-based partitioning for inter prediction of a video coding block and which provides an improved handling of occlusions and disocclusions. In particular, the encoding apparatus allows depending on a divergence measure, which indicates the divergence or the convergence of the first and second segment motion vectors, to apply different filters to the segments. Applying different motion-dependent filters to the segments has the advantage of allowing an improved handling of occlusions and disocclusions during the inter prediction process and, therefore, improves the coding efficiency of the encoding apparatus.

In a first possible implementation form of the encoding apparatus according to the third aspect as such, the motion-dependent filtering unit is configured to apply the first filter to a boundary between the predicted first segment and the predicted second segment of the predicted video coding block, in case the divergence measure indicates that the first segment motion vector and the second segment motion vector are diverging, wherein the first filter comprises a directional smoothing filter for smoothing across the boundary between the predicted first segment and the predicted second segment.

By providing a first filter in the form of a smoothing filter the effects of a disocclusion can be mitigated and the prediction error can be reduced, therefore, the coding efficiency can be improved.

In a second possible implementation form of the encoding apparatus according to the first implementation form of the third aspect, the motion-dependent filtering unit is configured to adjust a filter property of the first filter on the basis of the divergence measure, or on the basis of the first segment motion vector and the second segment motion vector, or on the basis of a difference between pixel values of pixels located at the boundary between the predicted first segment and the predicted second segment, wherein the filter property of the first filter comprises a first filter strength or a first filter size of the first filter.

Thus, properties of the first filter, such as a first filter strength, can be adapted to the strength of the divergence of the segment motion vectors and in this way, first filters with different strengths or sizes can be adapted to different environments in which embodiments of the present disclosure are applied, and the flexibility of selecting the first filter can be achieved, thereby, the coding efficiency can be improved.

In a third possible implementation form of the encoding apparatus according to the third aspect as such or the first or the second implementation form thereof, the motion-dependent filtering unit is configured to determine whether the predicted first segment or the predicted second segment is a background segment or to determine whether the predicted first segment or the predicted second segment is a foreground segment.

In a fourth possible implementation form of the encoding apparatus according to the third implementation form of the third aspect, the motion-dependent filtering unit is further configured to apply the second filter to the predicted video coding block, in case the divergence measure indicates that the first segment motion vector and the second segment motion vector are converging, wherein the second filter comprises a feathering filter for feathering in the direction of the background segment or in the opposite direction of the foreground segment.

By providing a second filter in the form of a feathering filter the effects of an occlusion can be mitigated and the prediction error can be reduced, therefore, the coding efficiency can be improved.

In a fifth possible implementation form of the encoding apparatus according to the third or fourth implementation form of the third aspect, the motion-dependent filtering unit is configured to adjust a filter property of the second filter on the basis of the divergence measure, wherein the filter property of the second filter comprises a second filter strength or a second filter size of the second filter.

Thus, properties of the second filter, such as a second filter strength, can be adapted to the strength of the convergence of the segment motion vectors and in this way, second filters with different strengths or sizes can be adapted to different environments in which embodiments of the present disclosure are applied, and the flexibility of selecting the second filter can be achieved, thereby, the coding efficiency can be improved.

In a sixth possible implementation form of the encoding apparatus according to the third aspect as such or any one of the first to fifth implementation form thereof, the encoding unit is further configured to encode information in an encoded video signal about whether the predicted first segment or the predicted second segment is the background segment, or encode information in an encoded video signal about whether the predicted first segment or the predicted second segment is the foreground segment.

In a seventh possible implementation form of the encoding apparatus according to the third aspect as such or any one of the first to sixth implementation form thereof, the first segment motion vector and the second segment motion vector define a vector field and wherein the motion-dependent filtering unit is configured to determine the divergence measure on the basis of the first segment motion vector and the second segment motion vector as the divergence of the vector field, and wherein the divergence of the vector field being smaller than a first threshold value indicates that the first segment motion vector and the second segment motion vector are converging and wherein the divergence of the vector field being larger than the first threshold value indicates that the first segment motion vector and the second segment motion vector are diverging. In an implementation form, the threshold value is zero.

The divergence of the motion vector field defined by the first and second segment motion vectors provides an efficient divergence measure of the first and second segment motion vectors. In an implementation form, a discretized version of the divergence operator based on finite differences can be used to determine the divergence of the motion vector field defined by the first and second segment motion vectors in an efficient manner.

In an eighth possible implementation form of the encoding apparatus according to the third aspect as such or any one of the first to seventh implementation form thereof, the inter prediction unit further comprises a segmentation refinement unit configured to shift a boundary between the predicted first segment and the predicted second segment on the basis of a boundary shift vector associated with the boundary, wherein the motion-dependent filtering unit is configured to apply depending on the divergence measure the first filter or the second filter to the shifted boundary between the predicted first segment and the predicted second segment.

Prediction artifacts can be mitigated by shifting the boundary between the first segment and the second segment and the prediction error can be reduced, therefore, the coding efficiency can be improved.

In a ninth possible implementation form of the encoding apparatus according to the eighth implementation form of the third aspect, the segmentation refinement unit is configured to determine the boundary shift vector on the basis of a distortion measure between the video coding block and the predicted video coding block.

In a tenth possible implementation form of the encoding apparatus according to the eighth or ninth implementation form of the third aspect, the segmentation refinement unit is configured to determine the boundary shift vector from a set of candidate boundary shift vectors, wherein the candidate boundary shift vectors are smaller than or equal to a difference vector between the first segment motion vector and the second segment motion vector.

This implementation form has the advantage of optimizing the choice of the boundary shift vector and, therefore, of optimizing the coding efficiency of the encoding apparatus.

According to a fourth aspect the disclosure relates to a corresponding method for encoding a video coding block of a current frame of a video signal, wherein the video signal comprises a plurality of frames and each frame is dividable into a plurality of video coding blocks. The encoding method comprises the following steps: partitioning the video coding block into two or more segments including a first segment and a second segment; determining a co-located first segment in a first reference frame of the video signal and a co-located second segment in a second reference frame of the video signal, wherein the first segment and the co-located first segment define a first segment motion vector and wherein the second segment and the co-located second segment define a second segment motion vector; generating a motion-compensated predicted video coding block on the basis of the co-located first segment and the co-located second segment and the first segment motion vector and the second segment motion vector, wherein the predicted video coding block comprises a predicted first segment and a predicted second segment; determining a divergence measure on the basis of the first segment motion vector and the second segment motion vector; applying depending on the divergence measure a first filter or a second filter to the predicted video coding block; and generating an encoded video coding block on the basis of the filtered predicted video coding block.

Thus, an encoding method is provided, which is based on segmentation-based partitioning for inter prediction of a video coding block and which provides an improved handling of occlusions and disocclusions. In particular, the encoding method allows depending on a divergence measure, which indicates the divergence or the convergence of the first and second segment motion vectors, to apply different filters to the segments.

Applying different motion-dependent filters to the segments has the advantage of allowing an improved handling of occlusions and disocclusions during the inter prediction process and, therefore, improves the coding efficiency of the encoding method.

In a first possible implementation form of the encoding method according to the fourth aspect as such, the step of applying depending on the divergence measure a first filter or a second filter to the predicted video coding block comprises applying the first filter to a boundary between the predicted first segment and the predicted second segment of the predicted video coding block, in case the divergence measure indicates that the first segment motion vector and the second segment motion vector are diverging, wherein the first filter comprises a directional smoothing filter for smoothing across the boundary between the predicted first segment and the predicted second segment.

By providing a first filter in the form of a smoothing filter the negative effects of a disocclusion can be mitigated and the prediction error can be reduced, which, in turn, improves the coding efficiency.

In a second possible implementation form of the encoding method according to the first implementation form of the fourth aspect, the encoding method comprises the further step of adjusting a filter property of the first filter on the basis of the divergence measure, or on the basis of the first segment motion vector and the second segment motion vector, or on the basis of a difference between pixel values of pixels located at the boundary between the predicted first segment and the predicted second segment, wherein the filter property of the first filter comprises a first filter strength or a first filter size of the first filter.

Thus, properties of the first filter, such as a first filter strength or size, can be adapted to the strength of the divergence, i.e. the strength of a disocclusion, and in this way the size and/or strength of the first filter can be adapted to different video coding scenarios, thereby improving the coding efficiency.

In a third possible implementation form of the encoding method according to the fourth aspect as such or the first or the second implementation form thereof, the encoding method comprises the further step of determining whether the predicted first segment or the predicted second segment is a background segment or the further step of determining whether the predicted first segment or the predicted second segment is a foreground segment.

In a fourth possible implementation form of the encoding method according to the third implementation form of the fourth aspect, the step of applying depending on the divergence measure a first filter or a second filter to the predicted video coding block comprises applying the second filter to the predicted video coding block, in case the divergence measure indicates that the first segment motion vector and the second segment motion vector are converging, wherein the second filter comprises a feathering filter for feathering in the direction of the background segment or in the opposite direction of the foreground segment.

By providing a second filter in the form of a feathering filter the effects of an occlusion can be mitigated and the prediction error can be reduced, therefore, the coding efficiency can be improved.

In a fifth possible implementation form of the encoding method according to the third or fourth implementation form of the fourth aspect, the encoding method comprises the further step of adjusting a filter property of the second filter on the basis of the divergence measure, wherein the filter property of the second filter comprises a second filter strength or a second filter size of the second filter.

Thus, properties of the second filter, such as a second filter strength or size, can be adapted to the strength of the divergence, i.e. the strength of an occlusion, and in this way the size and/or strength of the second filter can be adapted to different video coding scenarios, thereby improving the coding efficiency.

In a sixth possible implementation form of the encoding method according to the fourth aspect as such or any one of the first to fifth implementation form thereof, the encoding method comprises the further step of encoding information in an encoded video signal about whether the predicted first segment or the predicted second segment is the background segment, or the further step of encoding information in an encoded video signal about whether the predicted first segment or the predicted second segment is the foreground segment.

In a seventh possible implementation form of the encoding method according to the fourth aspect as such or any one of the first to sixth implementation form thereof, the first segment motion vector and the second segment motion vector define a vector field and the step of determining a divergence measure on the basis of the first segment motion vector and the second segment motion vector comprises the step of determining the divergence measure on the basis of the first segment motion vector and the second segment motion vector as the divergence of the vector field, wherein the divergence of the vector field being smaller than a first threshold value indicates that the first segment motion vector and the second segment motion vector are converging and wherein the divergence of the vector field being larger than the first threshold value indicates that the first segment motion vector and the second segment motion vector are diverging. In an implementation form, the threshold value is zero.

The divergence of the motion vector field defined by the first and second segment motion vectors provides an efficient divergence measure of the first and second segment motion vectors. In an implementation form, a discretized version of the divergence operator based on finite differences can be used to determine the divergence of the motion vector field defined by the first and second segment motion vectors in an efficient manner.

In an eighth possible implementation form of the encoding method according to the fourth aspect as such or any one of the first to seventh implementation form thereof, the encoding method comprises the further step of shifting a boundary between the predicted first segment and the predicted second segment on the basis of a boundary shift vector associated with the boundary, wherein the step of applying depending on the divergence measure a first filter or a second filter to the predicted video coding block comprises applying depending on the divergence measure the first filter or the second filter to the shifted boundary between the predicted first segment and the predicted second segment.

Prediction artifacts can be mitigated by shifting the boundary between the first segment and the second segment and the prediction error can be reduced, therefore, the coding efficiency can be improved.

In a ninth possible implementation form of the encoding method according to the eighth implementation form of the fourth aspect, the step of shifting a boundary between the predicted first segment and the predicted second segment on the basis of a boundary shift vector associated with the boundary comprises the step of determining the boundary shift vector on the basis of a distortion measure between the video coding block and the predicted video coding block.

In a tenth possible implementation form of the encoding method according to the eighth or ninth implementation form of the fourth aspect, the step of shifting a boundary between the predicted first segment and the predicted second segment on the basis of a boundary shift vector associated with the boundary comprises the step of determining the boundary shift vector from a set of candidate boundary shift vectors, wherein the candidate boundary shift vectors are smaller than or equal to a difference vector between the first segment motion vector and the second segment motion vector.

This implementation form has the advantage of optimizing the choice of the boundary shift vector and, therefore, of optimizing the coding efficiency of the encoding method.

According to a fifth aspect the disclosure relates to a computer program comprising program code for performing the decoding method according to the second aspect or the encoding method according to the fourth aspect when executed on a computer.

Embodiments of the disclosure can be implemented in hardware and/or software.

BRIEF DESCRIPTION OF THE DRAWINGS

Further embodiments of the disclosure will be described with respect to the following figures, wherein:

FIG. 1B shows a schematic diagram illustrating a more detailed view of specific components of the encoding apparatus of FIG. 1a;

FIG. 2B shows a schematic diagram illustrating a more detailed view of specific components of the decoding apparatus of FIG. 2a;

In the various figures, identical reference signs will be used for identical or at least functionally equivalent features.

DETAILED DESCRIPTION OF THE EMBODIMENTS

In the following description, reference is made to the accompanying drawings, which form part of the disclosure, and in which are shown, by way of illustration, specific aspects in which embodiments of the present disclosure may be placed. It is understood that other aspects may be utilized and structural or logical changes may be made without departing from the scope of the present disclosure. The following detailed description, therefore, is not to be taken in a limiting sense, as the scope of the present disclosure is defined be the appended claims.

For instance, it is understood that a disclosure in connection with a described method may also hold true for a corresponding device or system configured to perform the method and vice versa. For example, if a specific method step is described, a corresponding device may include a unit to perform the described method step, even if such unit is not explicitly described or illustrated in the figures. Further, it is understood that the features of the various exemplary aspects described herein may be combined with each other, unless noted otherwise.

Figure 1A:
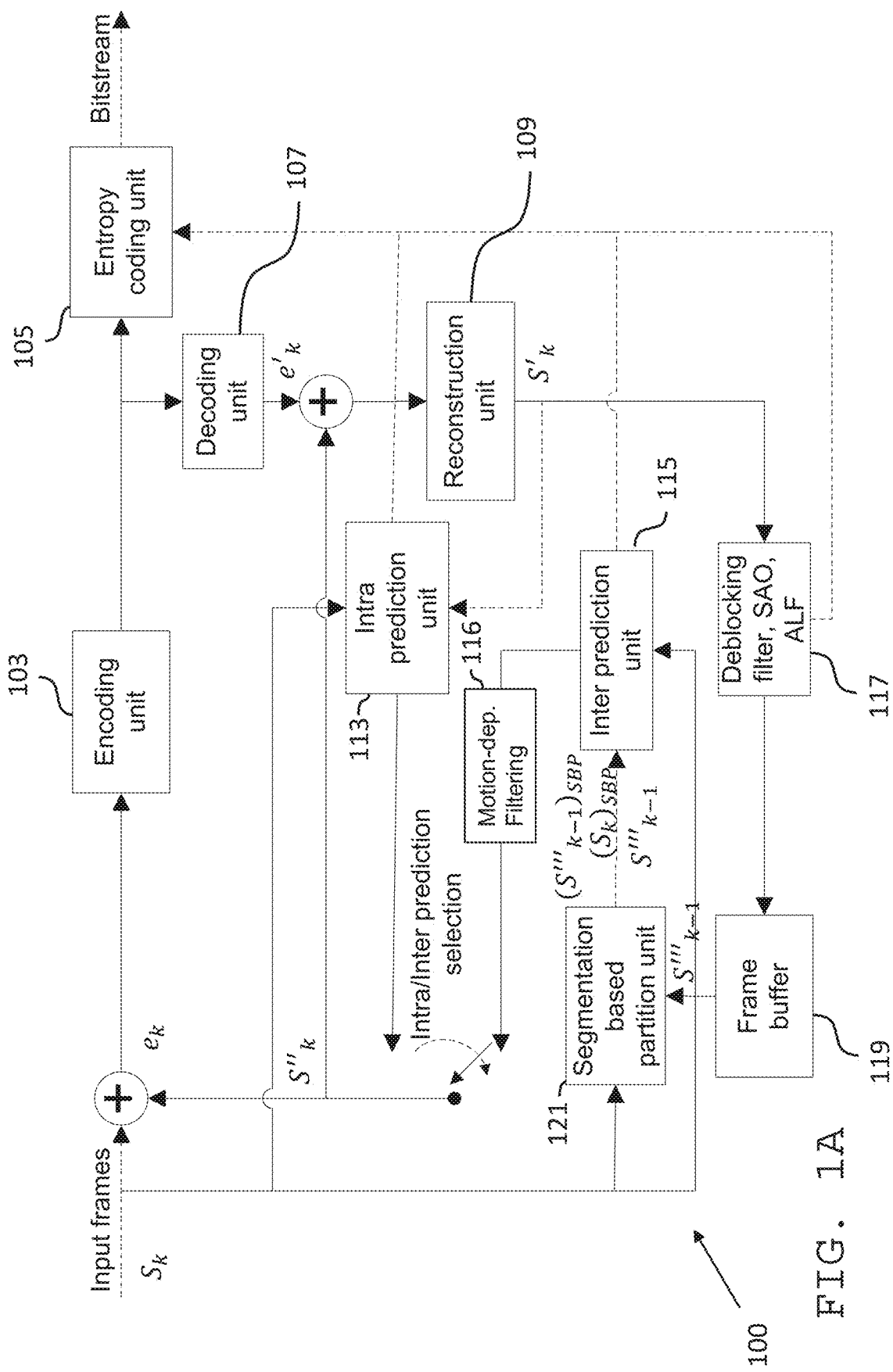
FIG. 1A shows a schematic diagram illustrating an apparatus for encoding a video signal according to an embodiment.

FIG. 1A shows a schematic diagram illustrating an apparatus 100 for encoding a video coding block of a video signal according to an embodiment. The encoding apparatus 100 is configured to encode a video coding block of a video signal comprising a plurality of frames (also referred to as pictures or images herein), wherein each frame is dividable into a plurality of video coding blocks and each video coding block comprises a plurality of pixels. In an embodiment, the video coding blocks could be macro blocks, coding tree units, coding units, prediction units and/or prediction blocks.

In the embodiment shown in FIG. 1A, the encoding apparatus 100 is implemented in the form of a hybrid video coding encoder. In hybrid video coding, an input frame is normally divided into blocks for further processing. The block partitioning is conveyed to the decoder, such as the decoding apparatus 200 shown in FIGS. 2A and 2B. Usually, the first frame of an input video sequence is an intra frame, which is encoded using only intra prediction. To this end, the embodiment of the encoding apparatus 100 shown in FIG. 1 comprises an intra prediction unit 113 for intra prediction. An intra frame can be decoded without information from other frames. The video coding blocks of subsequent frames following the first intra frame can be coded using inter or intra prediction.

In the embodiment shown in FIG. 1, the encoding apparatus 100 further comprises a segmentation based partitioning unit 121 configured to partition the video coding block into two or more segments including a first segment and a second segment.

Figure 5:
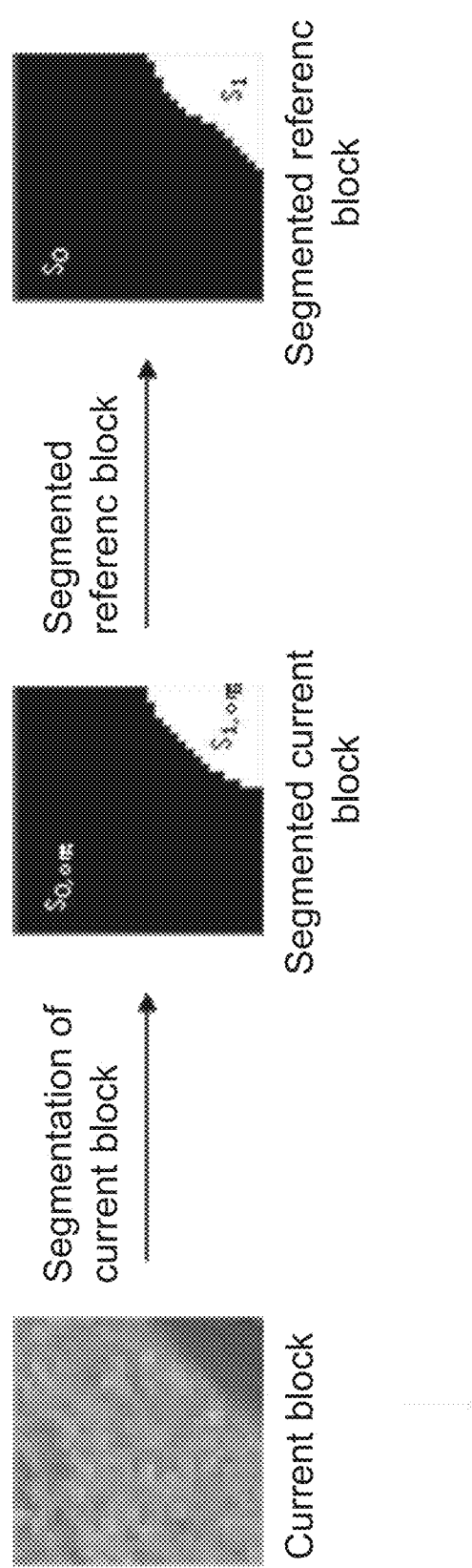
FIG. 5 shows a schematic diagram illustrating different aspects implemented in an encoding apparatus and a decoding apparatus according to an embodiment.

In a segmentation based partitioning scheme, the segmentation is obtained through segmentation of reference pictures or frames, which are available at both the encoding side and the decoding side. In order to locate a segmentation matching a currently processed block (which is to be encoded or decoded) in the segmented reference picture, an additional motion vector, called the boundary motion vector $MV_B$ can be used. The boundary motion vector MV can be determined by the encoding apparatus 100 by searching for a segmentation in the segmented reference picture, which most closely resembles the segmentation of the currently processed block. As the $MV_B$ can be transmitted to the decoding apparatus 200, an additional cost factor limiting the size of $MV_B$ is used. This process is exemplified in FIG. 5, where it can be seen that the segmented reference block closely resembles the segmented current video coding block.

Figure 1B:
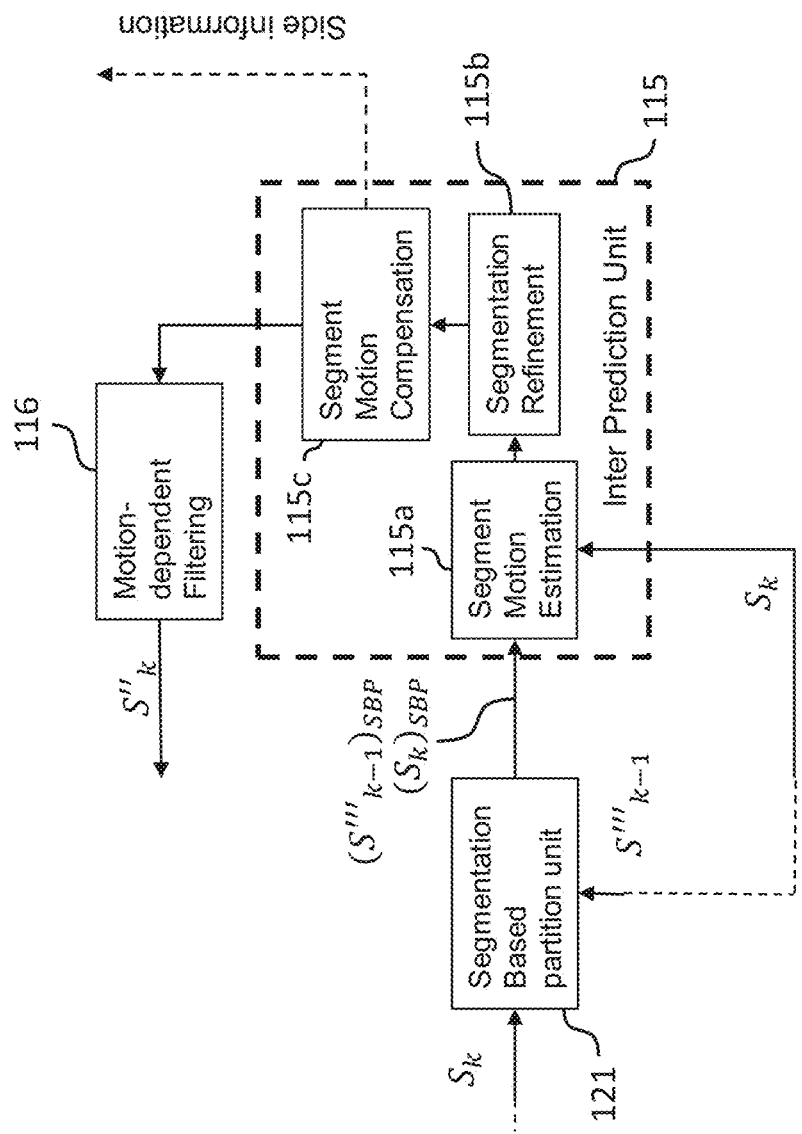

Furthermore, the encoding apparatus 100 comprises an inter prediction unit 115. A more detailed view of the inter prediction unit 115 and its environment according to an embodiment is shown in FIG. 1B. Generally, the inter prediction unit 115 can be configured to perform motion estimation, motion compensation for choosing motion data including a selected reference picture, motion vector, mode decision and other information. In the embodiment shown in FIGS. 1A and 1B, the signals input to the inter prediction unit 115 include the input frame Sk and the decoded frame S'''k−1 as output by a frame buffer 119. FIG. 1A shows an embodiment, in which the decoded frame S'''k−1 is first provided from the frame buffer 119 to the segmentation based partitioning unit 121 and from the segmentation based partitioning unit 121 to the inter prediction unit 115. Clearly, this is only a possible configuration and in other embodiments the decoded frame S'''k−1 may also be provided from the frame buffer 119 directly to the inter prediction unit 115. In such an embodiment, a direct connection between the frame buffer 119 and the inter prediction unit 115 would be provided.

Further, the inter prediction unit 115 is configured to determine a co-located first segment in a first reference frame of the video signal and a co-located second segment in a second reference frame of the video signal, wherein the first segment and the co-located first segment define a first segment motion vector $MV_{S0}$ and wherein the second segment and the co-located second segment define a second segment motion vector $MV_{S1}$. In an embodiment, the first reference frame and the second reference frame can be the same reference frame. In an embodiment, these functions of the inter prediction unit 115 can be provided by a segment motion estimation unit 115a, a segmentation refinement unit 115b and a segment motion compensation unit 115c which will be described in more detail further below.

Moreover, the inter prediction unit 115 is further configured to generate a predicted video coding block on the basis of the co-located first segment and the co-located second segment, wherein the predicted video coding block comprises a predicted first segment and a predicted second segment.

For more details about segmentation based partitioning and generating a predicted video coding block comprising a predicted first segment and a predicted second segment on the basis of a co-located first segment and a co-located second segment reference is made to WO2008/150113A1, which is herein fully incorporated by reference.

As can be taken from FIGS. 1A and 1B, the encoding apparatus 100 further comprises a motion-dependent filtering unit 116, which is located downstream of the inter prediction unit 115. The motion-dependent filtering unit 116 is configured to determine a divergence measure on the basis of the first segment motion vector $MV_{S0}$ and the second segment motion vector $MV_{S1}$ and to apply depending on the divergence measure a first filter or a second filter to the predicted video coding block. Further embodiments of the motion-dependent filtering unit 116 will be described in more detail further below.

Further, the encoding apparatus 100 comprises an encoding unit, which in the embodiment shown in FIG. 1A is provided by an encoding unit 103 and/or an entropy coding unit 105 and which is configured to generate an encoded video coding block on the basis of the filtered predicted video coding block. Further, in the embodiment shown in FIG. 1A the prediction error of the intra/inter picture prediction, which is the difference between the original block and its prediction, is encoded by the encoding unit 103 including such processes as transform, transform skip, scaling, quantization or others. The output of the encoding unit 103 as well as the coding or side information provided by the intra prediction unit 113, the inter prediction unit 115 and a deblocking filter/sample adaptive offset (SAO)/adaptive loop filtering (ALF) unit 117 are further encoded by the entropy coding unit 105.

A hybrid video encoder usually duplicates the decoder processing such that both will generate the same predictions. Thus, in the embodiment shown in FIG. 1A a decoding unit 107 performs the inverse operations of the encoding unit 103 and duplicates the decoded approximation of the prediction error/residual data. The decoded prediction error/residual data is then added to the results of prediction. A reconstruction unit 109 obtains the results of adding the prediction and the residuals. Then, the output of the reconstruction unit 109 might be further processed by one or more filters, summarized by the deblocking filter/SAO/ALF unit 117 shown in FIG. 1A, to smooth the coding artifacts. The final picture is stored in the frame buffer 119 and can be used for the prediction of subsequent frames. As already described above, the segmentation based partitioning unit 121 can perform all possible steps of object boundary based partition including possible pre- and post-processing. The segmentation based partitioning unit 121 can adaptively generate a segmentation for the current block on the basis of one or more reference frames. Segmentation related parameters can be encoded and transmitted as a part of coding or side information to the decoding apparatus 200 shown in FIGS. 2A and 2B.

Figure 2A:
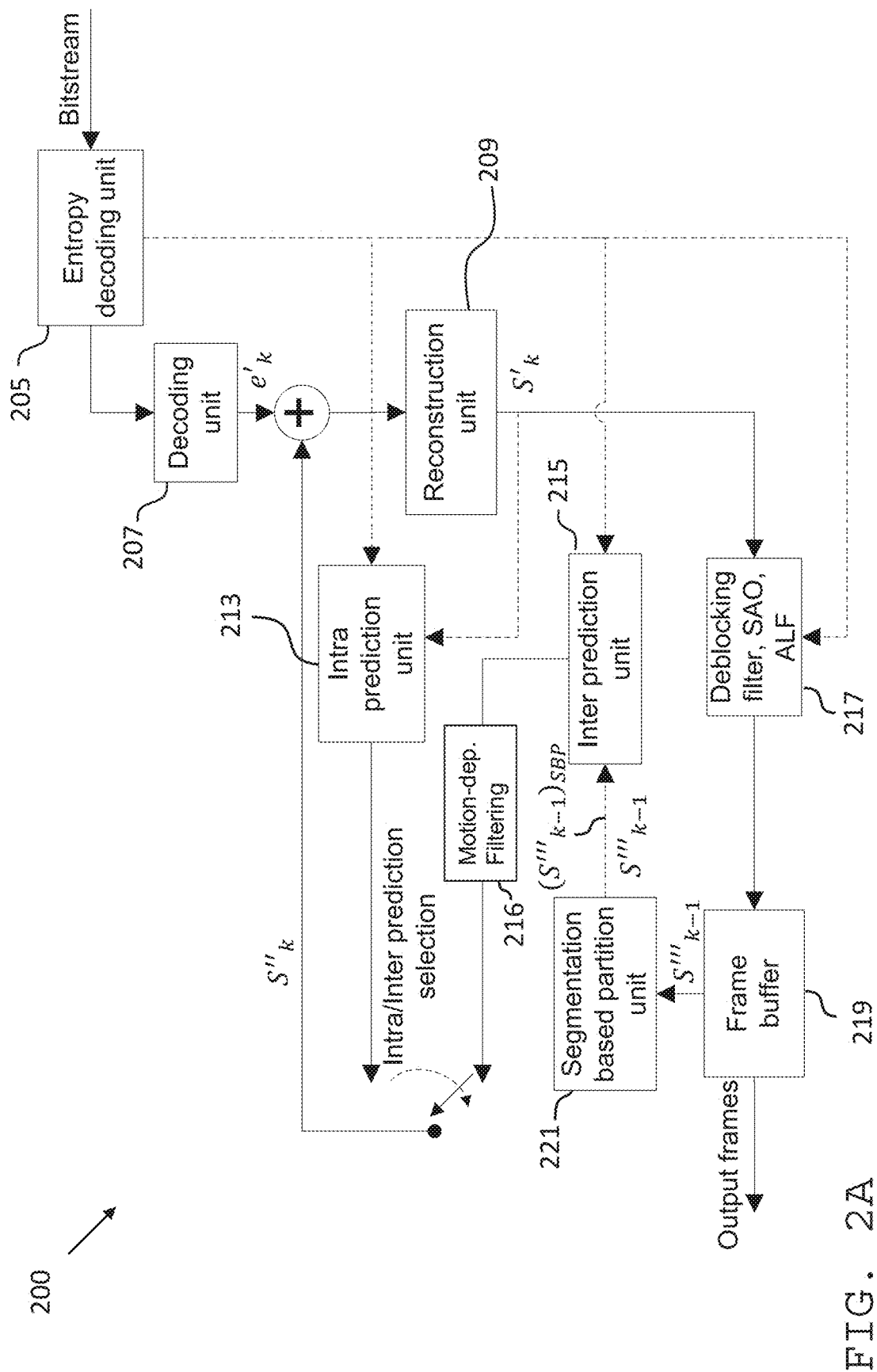
FIG. 2A shows a schematic diagram illustrating an apparatus for decoding a video signal according to an embodiment.
Figure 2B:
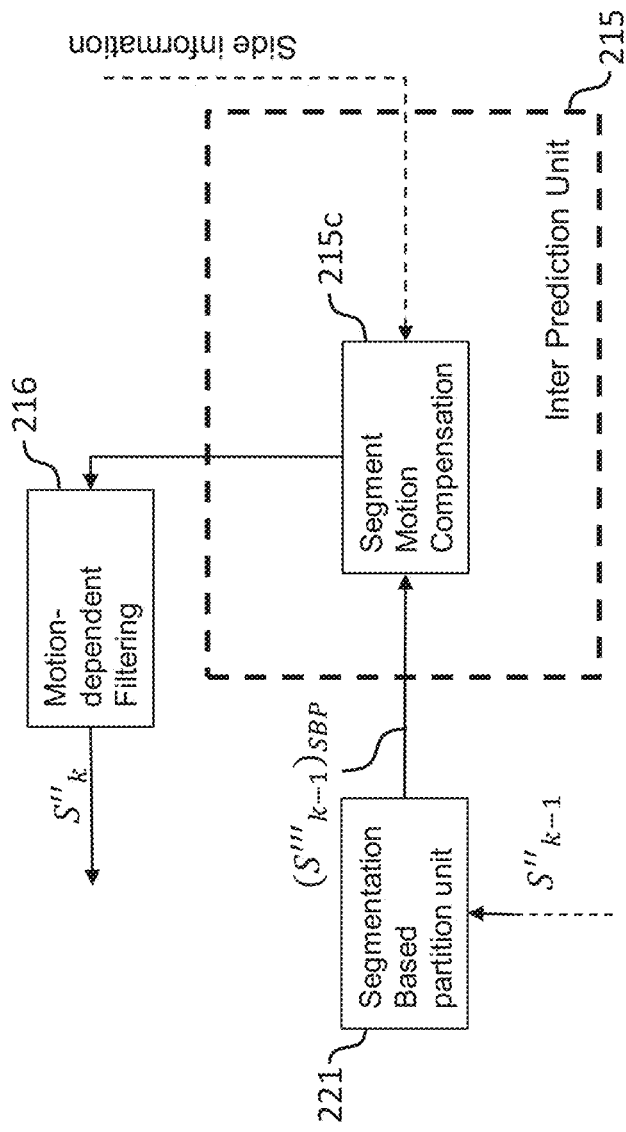

FIGS. 1A and 2B show respective schematic diagram illustrating an apparatus for 200 decoding a video signal according to an embodiment as well as some details thereof. The decoding apparatus 200 is configured to decode a video coding block of a current frame of an encoded video signal, wherein the encoded video signal, which in the embodiment shown in FIG. 2A is provided in form of a bitstream, comprises coding or side information and a plurality of frames and wherein each frame is divided into a plurality of video coding blocks.

In the embodiment shown in FIG. 2A, the decoding apparatus 200 is implemented as a hybrid decoder. An entropy decoding unit 205 performs entropy decoding of the encoded bitstream, which generally can comprise prediction errors (i.e. residual video coding blocks), motion data and other side information, which are needed, in particular, for an intra prediction unit 213 and an inter prediction unit 215 as well as other components of the decoding apparatus 200, such as a deblocking filter, SAO and ALF unit 217. Generally, the intra prediction unit 213 and the inter prediction unit 215 of the decoding apparatus 200 shown in FIG. 2A perform in the same way as the intra prediction unit 113 and the inter prediction unit 115 of the encoding apparatus 100 shown in FIG. 1A (with the exception that motion estimation is not performed by the decoding apparatus 200) such that identical predictions can be generated by the encoding apparatus 100 and the decoding apparatus 200. Also in case of the decoding apparatus 200, the signals input to the inter prediction unit 215 include the decoded frame S'''k−1 as output by the frame buffer 219. The schematic block diagram illustrated in FIG. 2A shows a configuration in which the decoded frame is first input from the frame buffer 219 to a segmentation based partitioning unit 221, which will be described in more detail further below, and from the segmentation based partitioning unit 221 to the inter prediction unit 215. Clearly, this is a possible configuration and in other embodiments the decoded frame may also be input from the frame buffer 219 directly to the inter prediction unit 215. In this case a direct connection between the frame buffer 219 and the inter prediction unit 215 would be provided.

The segmentation based partitioning unit 221 of the decoding apparatus 200 is configured to partition the video coding block on the basis of the coding or side information into two or more segments including a first segment and a second segment, wherein the coding information comprises a first segment motion vector $MV_{S0}$ associated with the first segment of the video coding block and a second segment motion vector $MV_{S1}$ associated with the second segment of the video coding block.

The inter prediction unit 215 of the decoding apparatus 200 is configured to determine on the basis of the first segment motion vector $MV_{S0}$ a co-located first segment in a first reference frame and on the basis of the second segment motion vector $MV_{S1}$ a co-located second segment in a second reference frame and to generate a predicted video coding block on the basis of the co-located first segment and the co-located second segment, wherein the predicted video coding block comprises a predicted first segment and a predicted second segment. As shown in FIG. 2B, in an embodiment this function of the inter prediction unit 215 or a part thereof can be implemented in a segment motion compensation unit 215c. Further embodiments of the segment motion compensation unit 215c will be described in more detail further below.

A motion-dependent filtering unit 216 of the decoding apparatus 200 is configured to determine a divergence measure on the basis of the first segment motion vector $MV_{S0}$ and the second segment motion vector $MV_{S1}$ and to apply depending on the divergence measure a first filter or a second filter to the predicted video coding block. Further embodiments of the motion-dependent filtering unit 216 will be described in more detail further below.

A reconstruction unit 209 of the decoding apparatus 200 is configured to reconstruct the video coding block on the basis of the filtered predicted video coding block and the residual video coding block.

Thus, a decoding apparatus is provided, which is based on segmentation-based partitioning for inter prediction of a video coding block and which provides an improved handling of occlusions and disocclusions. In particular, the decoding apparatus allows depending on a divergence measure, which indicates the divergence or the convergence of the first and second segment motion vectors, to apply different filters to the segments.

Figure 3:
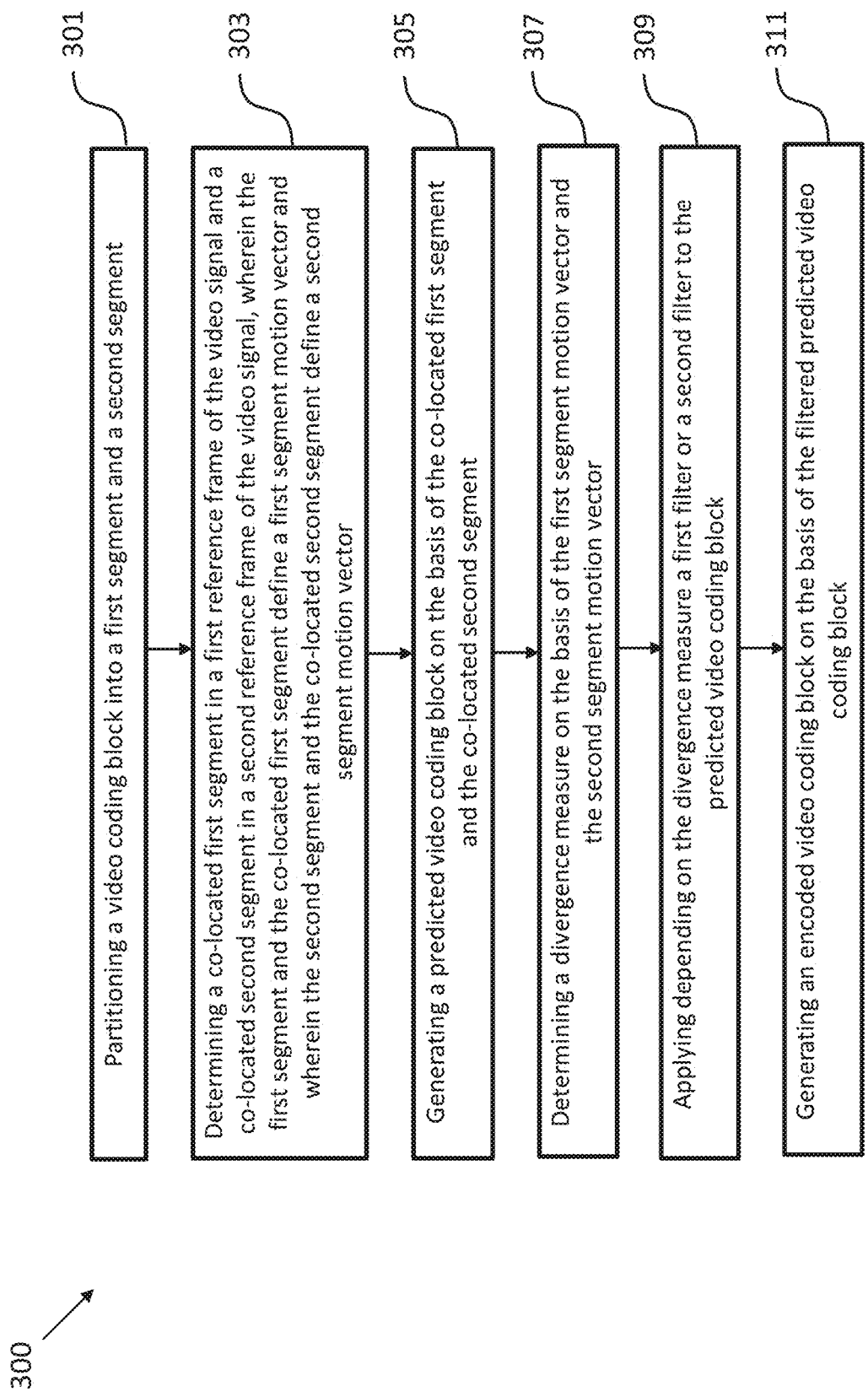
FIG. 3 shows a schematic diagram illustrating a method for encoding a video signal according to an embodiment.

FIG. 3 shows a schematic diagram illustrating a method 300 for encoding a video coding block of a current frame of a video signal, wherein the video signal comprises a plurality of frames and wherein each frame is dividable into a plurality of video coding blocks.

The encoding method 300 comprises the steps of: partitioning 301 the video coding block into two or more segments including a first segment and a second segment; determining 303 a co-located first segment in a first reference frame of the video signal and a co-located second segment in a second reference frame of the video signal, wherein the first segment and the co-located first segment define a first segment motion vector and wherein the second segment and the co-located second segment define a second segment motion vector; generating 305 a predicted video coding block on the basis of the co-located first segment and the co-located second segment, wherein the predicted video coding block comprises a predicted first segment and a predicted second segment; determining 307 a divergence measure on the basis of the first segment motion vector and the second segment motion vector; applying 309 depending on the divergence measure a first filter or a second filter to the predicted video coding block; and generating 311 an encoded video coding block on the basis of the filtered predicted video coding block.

Figure 4:
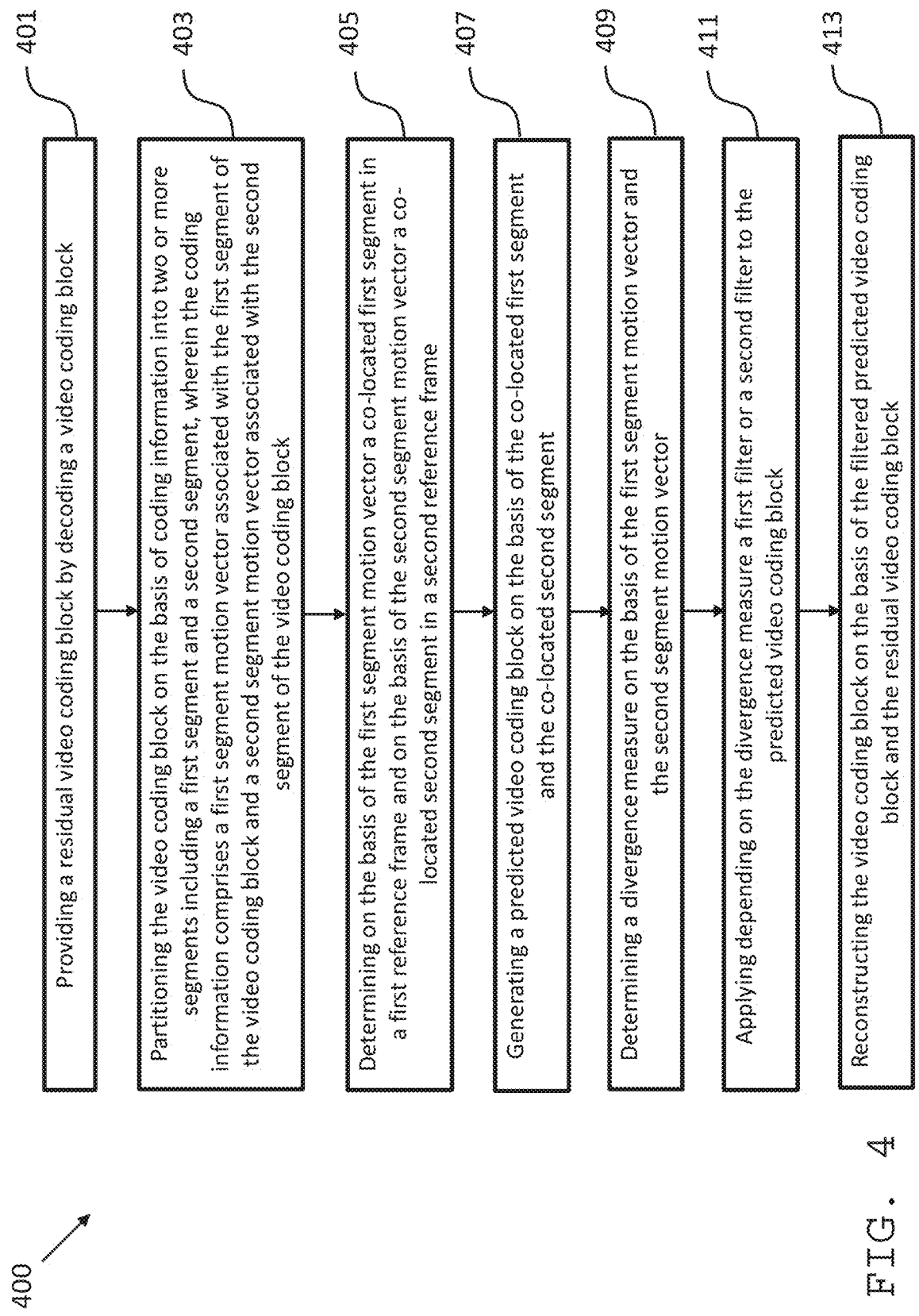
FIG. 4 shows a schematic diagram illustrating a method for decoding a video signal according to an embodiment.

FIG. 4 shows a schematic diagram illustrating an embodiment of a method 400 of decoding a video coding block of a current frame of an encoded video signal, wherein the encoded video signal comprises coding information and a plurality of frames and wherein each frame being divided into a plurality of video coding blocks.

The decoding method 400 comprises the steps of: providing 401 a residual video coding block by decoding the video coding block; partitioning 403 the video coding block on the basis of the coding information into two or more segments including a first segment and a second segment, wherein the coding information comprises a first segment motion vector associated with the first segment of the video coding block and a second segment motion vector associated with the second segment of the video coding block; determining 405 on the basis of the first segment motion vector a co-located first segment in a first reference frame and on the basis of the second segment motion vector a co-located second segment in a second reference frame; generating 407 a predicted video coding block on the basis of the co-located first segment and the co-located second segment, wherein the predicted video coding block comprises a predicted first segment and a predicted second segment; determining 409 a divergence measure on the basis of the first segment motion vector and the second segment motion vector; applying 411 depending on the divergence measure a first filter or a second filter to the predicted video coding block; and reconstructing 413 the video coding block on the basis of the filtered predicted video coding block and the residual video coding block.

In the following, further embodiments of the disclosure will be described in more detail. It is to be understood that, unless explicitly stated to the contrary, the further embodiments can be implemented in any one of the encoding apparatus 100, the decoding apparatus 200, the encoding method 300 and the decoding method 400.

In an embodiment, the segment motion estimation unit 115a of the inter prediction unit 115 of the encoding apparatus 100 is configured to perform a two-step process.

In a first step, the segment motion estimation unit 115a of the inter prediction unit 115 is configured to perform a segmentation mask matching for the current video coding block, where the best segmentation from a reference frame is chosen according to a cost criterion JB being minimized. In an embodiment, the cost criterion $J_B$ can be based on the following equation:

$$J_B = \lambda_1 D_{SAD} + \lambda_2 R_{MVB},$$

wherein $D_{SAD}$ denotes the distortion measured by sum-of-absolute-differences between the segmentation of the current block and the segmentation of the reference block, $R_{MVB}$ denotes a rate estimate for the boundary motion vector and $\lambda_1, \lambda_2$ denotes quality dependent Lagrangian multipliers. The boundary motion vector and its associated information can be signaled to the decoding apparatus 200.

In a second step, the segment motion estimation unit 115a is configured to compute on the basis of previously estimated complementary segmentation masks M0, M1 $\in (0,1)$, the motion vectors for segments S0 and S1 by segment-wise motion estimation between the current block C and a reference block R, where $$D_{SAD}^k = \sum_{i,j} |C(i,j) - R(i,j)| M_k(i,j)$$

denotes the segment distortion estimated by the sum-of-absolute-differences (SAD). Block-wise calculation of differences and multiplication by a segmentation mask is a possible implementation of pixel-exact motion estimation. Thus, segment motion vectors can be chosen separately at this point. e.g. minimizing the residual of each segment according to the minimum of the following cost function:

$$J_{MV}^k = D_{SAD}^k + \lambda_3 R_{MV}^k.$$

Once the segment motion vectors have been determined, additional estimation steps may be performed, such as quarter-pixel refinement, testing of bi-prediction, advanced motion vector prediction and testing of motion vector merging. Further details about these further processing steps can be found in other approaches.

Figure 6:
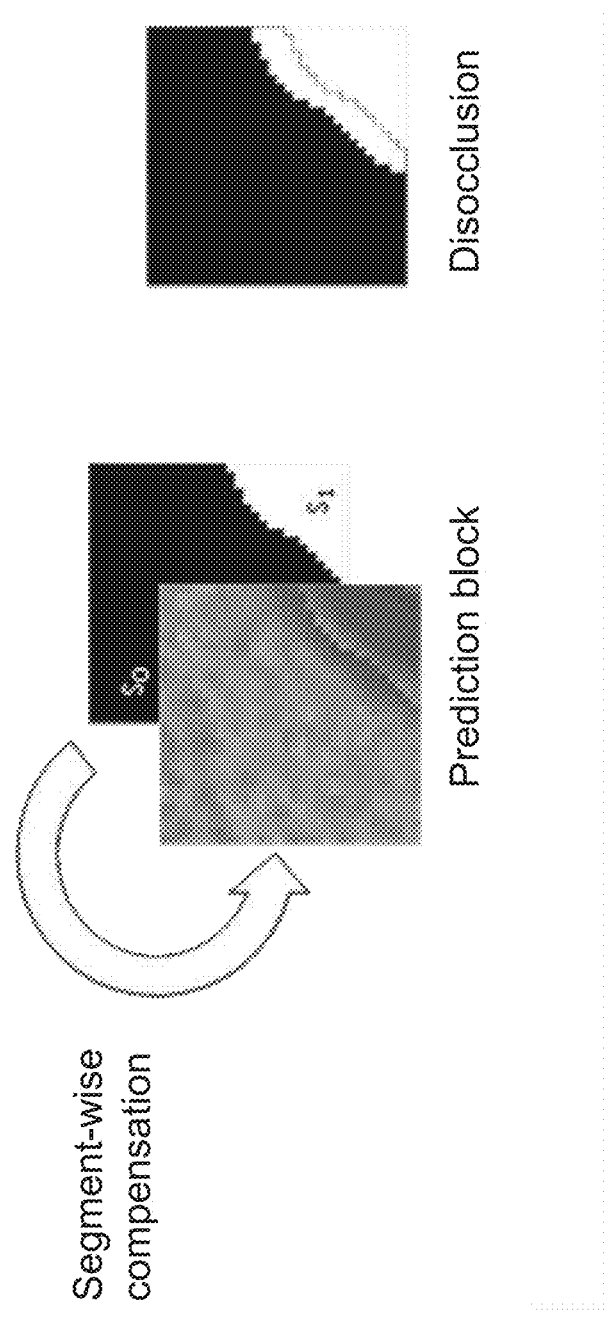
FIG. 6 shows a schematic diagram illustrating different aspects implemented in an encoding apparatus and a decoding apparatus according to an embodiment.

After the segment motion estimation performed by the segment motion estimation unit 115a of the inter prediction unit 115, the motion compensated prediction signal generated from both segments might reveal visible errors, for instance, in the case of a disocclusion, as illustrated in FIG. 6. By motion-compensating the background segment $S_0$ parts of the foreground object from the reference picture may be copied into the prediction signal, which would result in a strong residual in this area. To address this issue the inter prediction unit 115 of the encoding apparatus 100 can further comprise the segmentation refinement unit 115b shown in FIG. 1B. The purpose of the segmentation refinement unit 115b is to optimize the segmentation mask such that the overall residual block energy measured by $D_{SATD}$ is minimized. This can be achieved by artificially shifting the segmentation mask and thereby the boundary between the predicted first segment and the predicted second segment in the horizontal and vertical direction on the basis of an optimized boundary shift vector. Thus, in an embodiment the segmentation refinement unit 115b is configured to shift the boundary between the predicted first segment and the predicted second segment on the basis of such an optimized boundary shift vector. The motion-dependent filtering unit 116 is configured to apply the first filter or the second filter to the shifted boundary between the predicted first segment and the predicted second segment.

It must be noted, that the true object boundaries and the segmentation mask boundaries do not necessarily need to coincide anymore after this optimization step. Instead of the SAD, the sum-of-absolute-transform-difference (SATD) measure may be used, where H denotes a matrix of Hadamard-transform basis functions:

$$R_T = H*(C-P_m)*H^T \text{ and}$$

$$D_{SATD} = \Sigma_{i,j} |R_T(i,j)|.$$

Here, $P_m$ denotes the modified prediction signal generated by shifting or offsetting the complementary masks in the horizontal and vertical directions.

$$P_m = R(i+k_0, j+l_0) M_0(i+k_B, j+l_B) + R(i+k_1, j+l_1) M_1(i+k_B, j+l_B)$$

$MV_{Sn} = (k_n, l_n)$, $n \in \{0,1\}$ are the segment motion vectors which remain fixed and $(k_B, l_B)$ is the shifted boundary motion vector, i.e. the "real" boundary motion vector plus the optimized boundary shift vector. Thus, in an embodiment the segmentation refinement unit 115b can be configured to determine the optimized boundary shift vector and, thus, an optimized boundary motion vector on the basis of a distortion measure between the video coding block and the predicted video coding block.

The optimization of the boundary shift vector can be performed within a search range that can be inferred from the segment motion vector difference $MV_D$.

$$MV_D = MV_{S0} - MV_{S1}$$

where the magnitude of the motion vector difference gives an approximation of the size of, for instance, a disoccluded region. Thus, in an embodiment the segmentation refinement unit 115b is configured to determine the boundary shift vector from a set of candidate boundary shift vectors, wherein the candidate boundary shift vectors are smaller than or equal to a difference vector $MV_D$ between the first segment motion vector $MV_{S0}$ and the second segment motion vector $MV_{S1}$.

The optimized boundary shift vector which minimizes the overall distortion $D_{SATD}$ is finally chosen. Thus the optimized boundary motion vector. i.e. the "real" boundary motion vector plus the optimized boundary shift vector which minimizes the overall distortion $D_{SATD}$ is finally chosen.

Figure 7:
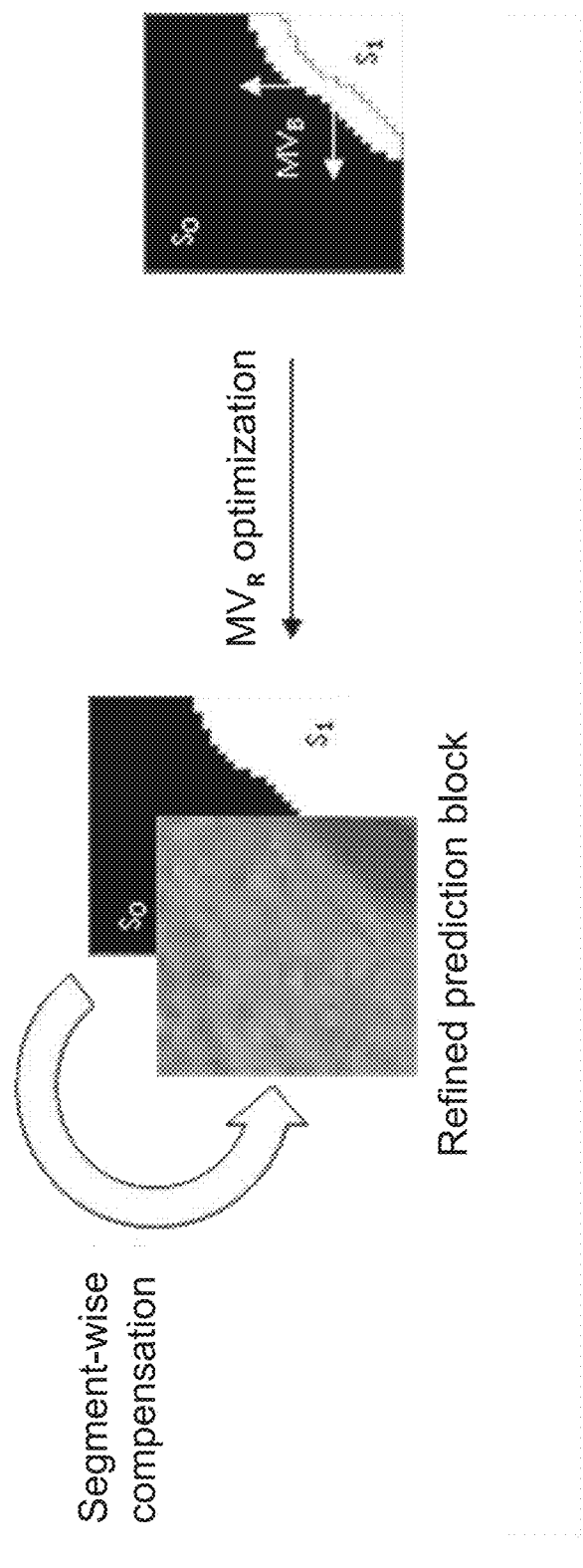
FIG. 7 shows a schematic diagram illustrating different aspects implemented in an encoding apparatus and a decoding apparatus according to an embodiment.

FIG. 7 shows an example illustrating the advantageous effect provided by the segmentation refinement unit 115b in that FIG. 7 shows the refined prediction signal generated by optimizing the boundary motion vector $MV_B$ after motion compensation. By optimizing the boundary motion vector, the disocclusion error has been visibly reduced. Background pixels, which have been included by the segmentation mask of foreground object $S_1$, are copied into the newly uncovered area.

As already described above, the filtering process implemented in the motion-dependent filtering units 116, 216 is motion dependent and performed during and after the motion compensation process implemented in the segment motion compensation units 115c, 215c at the encoder and decoder side in order to further improve the prediction signal by determining a divergence measure on the basis of the first segment motion vector $MV_{S0}$ and the second segment motion vector $MV_{S1}$ and applying depending on the divergence measure a first filter or a second filter to the predicted video coding block.

In an embodiment, the motion-dependent filtering unit 116, 216 is configured to apply the first filter to a boundary between the predicted first segment and the predicted second segment of the predicted video coding block, in case the divergence measure indicates that the first segment motion vector $MV_{S0}$ and the second segment motion vector $MV_{S1}$ are diverging, wherein the first filter comprises a directional smoothing filter for smoothing across the boundary between the predicted first segment and the predicted second segment.

In an embodiment, the motion-dependent filtering unit 116, 216 is further configured to apply the second filter to the predicted video coding block, in case the divergence measure indicates that the first segment motion vector $MV_{S0}$ and the second segment motion vector $MV_{S1}$ are converging, wherein the second filter comprises a feathering filter for feathering in the direction of a background segment or in the opposite direction of a foreground segment. In addition, the motion-dependent filtering unit 116, 216 can be configured to determine whether the predicted first segment or the predicted second segment is a background segment or to determine whether the predicted first segment or the predicted second segment is a foreground segment.

In an embodiment, the first segment motion vector $MV_{S0}$ and the second segment motion vector $MV_{S1}$ form a vector field F and the motion-dependent filtering unit 116 is configured to determine the divergence measure on the basis of the first segment motion vector $MV_{S0}$ and the second segment motion vector $MV_{S1}$ as the divergence of the vector field F, wherein the divergence of the vector field F being smaller than a first threshold indicates that the first segment motion vector $MV_{S0}$ and the second segment motion vector $MV_{S1}$ are converging and wherein the divergence of the vector field F being larger than the first threshold indicates that the first segment motion vector $MV_{S0}$ and the second segment motion vector $MV_{S1}$ are diverging. In an embodiment, the first threshold can be zero or other value or range which can be set according to different environments in which embodiments of the present disclosure is applied.

Thus in an embodiment, the filtering decision is inferred from the divergence of the vector field $F \in \{MV_{S0}, MV_{S1}\}$ according to the following criterion:

$\nabla \cdot F < 0 \rightarrow$ occlusion, feathering (i.e. the first segment motion vector and the second segment motion vector are converging.)

$\nabla \cdot F > 0 \rightarrow$ disocclusion, directional smoothing filtering (i.e. the first segment motion vector and the second segment motion vector are diverging.)

The vector divergence operator may be approximated by a suitable discrete realization such as finite differences. As two segment motion vectors per block are considered, in an embodiment an approximation of the vector divergence $F_{Div}$ (also referred to as the divergence of the vector field F) can be obtained from:

$$F_{Div}(MV_{S0}, MV_{S1}) = (MV_{S0,x} - MV_{S1,x}) + (MV_{S0,y} - MV_{S1,y}).$$

Thus, no information controlling the type of filtering needs to be transmitted. In particular, the divergence of the vector field F may be a measure of how much the first and second segment motion vector are converging or diverging. Furthermore, the difference vector may be just the first segment motion vector minus the second segment motion vector.

Figure 8:
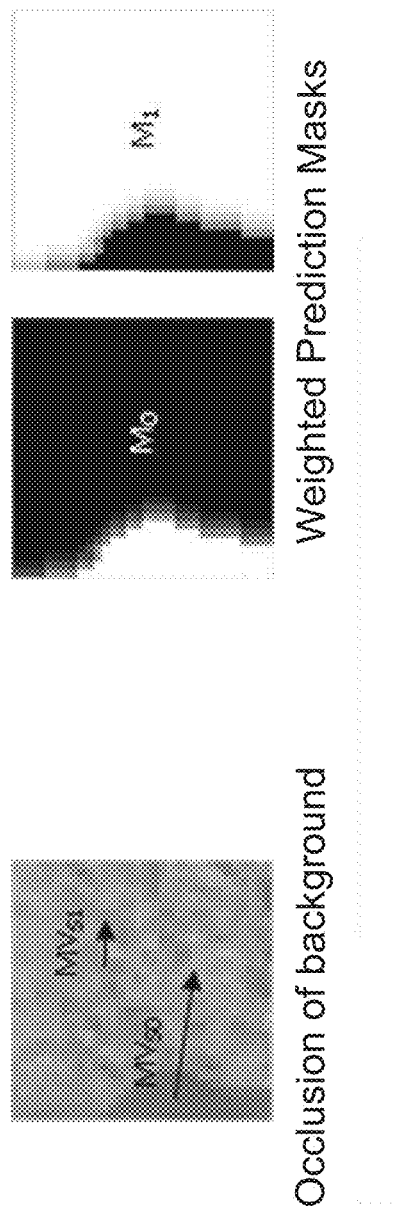
FIG. 8 shows a schematic diagram illustrating different aspects implemented in an encoding apparatus and a decoding apparatus according to an embodiment.

For applying the feathering filter, which can also be regarded as a kind of weighted prediction, in case of an occlusion the binary segmentation mask taken from the reference picture can be converted to a multilevel representation. The steep boundary separating the foreground segment and the background segment can be smoothed over a certain distance, where values between 0 and 1 indicate the weighting factor of pixel values between the two segments. By means of this operation parts of the foreground segment can be blended into the background segment. This is exemplified in FIG. 8. The addition of the two prediction masks $M_0$ and $M_1$ should be a matrix of all-ones.

Figure 9:
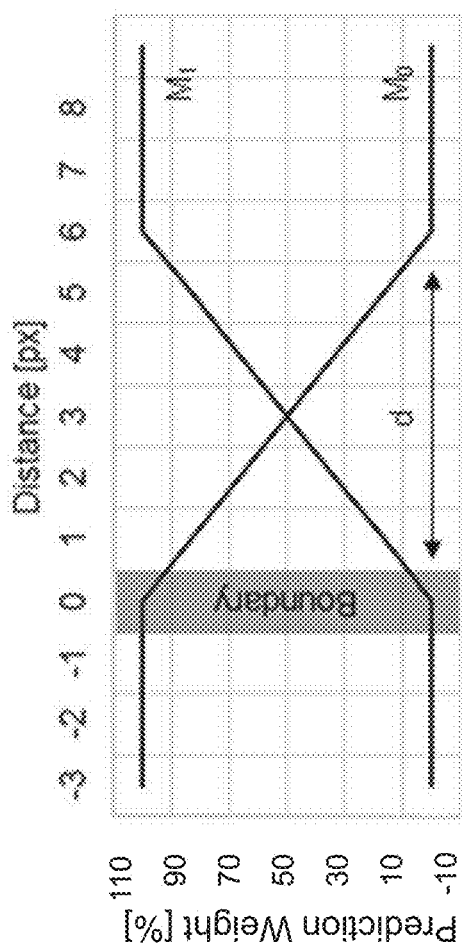
FIG. 9 shows a schematic diagram illustrating different aspects implemented in an encoding app

The amount of feathering applied in the direction of the background object can be measured by the distance d as indicated in FIG. 9. For strong movements, more feathering may be applied by increasing the value of d. In an embodiment, the value of d can be coupled to the vector divergence $F_{Div}$.

In the following, a weighting-matrix based feathering filter is specified as a possible embodiment, which can be implemented using integer arithmetic:

$$P_{m,f}(x, y) = \left\lfloor \frac{1}{s_b} \left( R_{c,0} \cdot M_0 + R_{c,1} \cdot M_1 + \frac{s_b}{2} \right) \right\rfloor, s_b = 2^{w_{max}}$$

wherein $R_{c,0}$ and $R_{c,1}$ denote the motion compensated segments, $M_0$ and $M_1$ denote the complementary weighting masks containing integer weights $m_{x,y}$, depending on the distance d to the boundary as specified in FIG. 9. Thus, a scaling factor $s_b$ can be provided to scale down the weighted sum accordingly, providing the final prediction block $P_{m,f}$. For an efficient implementation it is desirable to choose base-2 scaling such that division operations can be replaced by bit-shifting.

As already described above, in case of a disocclusion, the boundary pixels between the predicted first segment and the predicted second segment can be smoothed or low-pass filtered. This low-pass filter can be implemented as a directional or symmetric filter. To this end, a symmetric window centered at each boundary pixel can be defined, indicating the current region of interest. The low-pass filter may be directional and adapt to the orientation of the boundary within the symmetric window or may possess a symmetric kernel (e.g. a 2D-Gaussian) of specified size (e.g. 3×3, 5×5, 7×7, etc. pixels). In an embodiment, the size of the kernel can be inferred from the magnitude of the vector divergence. Additionally, the low-pass filter size and strength may be adaptable to the pixel-amplitude difference present along the boundary, where a stronger edge measured by $\Delta_B$ indicates that more smoothing is needed. This can be realized by comparison against a preset threshold $\gamma_{th}$, i.e.:

$\Delta_B = |p_0 - p_1| > \gamma_{th} \rightarrow$ strong filtering

Figure 10:
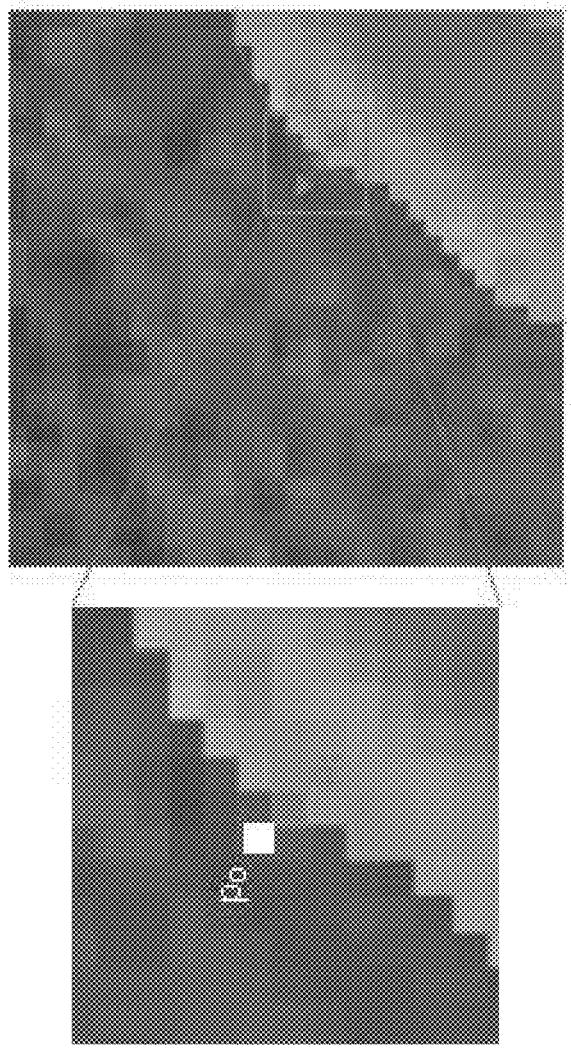
FIG. 10 shows a schematic diagram illustrating different aspects implemented in an encoding apparatus and a decoding apparatus according to an embodiment.

FIG. 10 exemplifies the operation of a directional smoothing/low-pass filter according to an embodiment, where filtering is performed along the normal of the boundary between the predicted first segment and the predicted second segment. By measuring the difference in pixel intensities at positions $p_0$ and $p_1$, the filter strength can be adapted.

Figure 11:
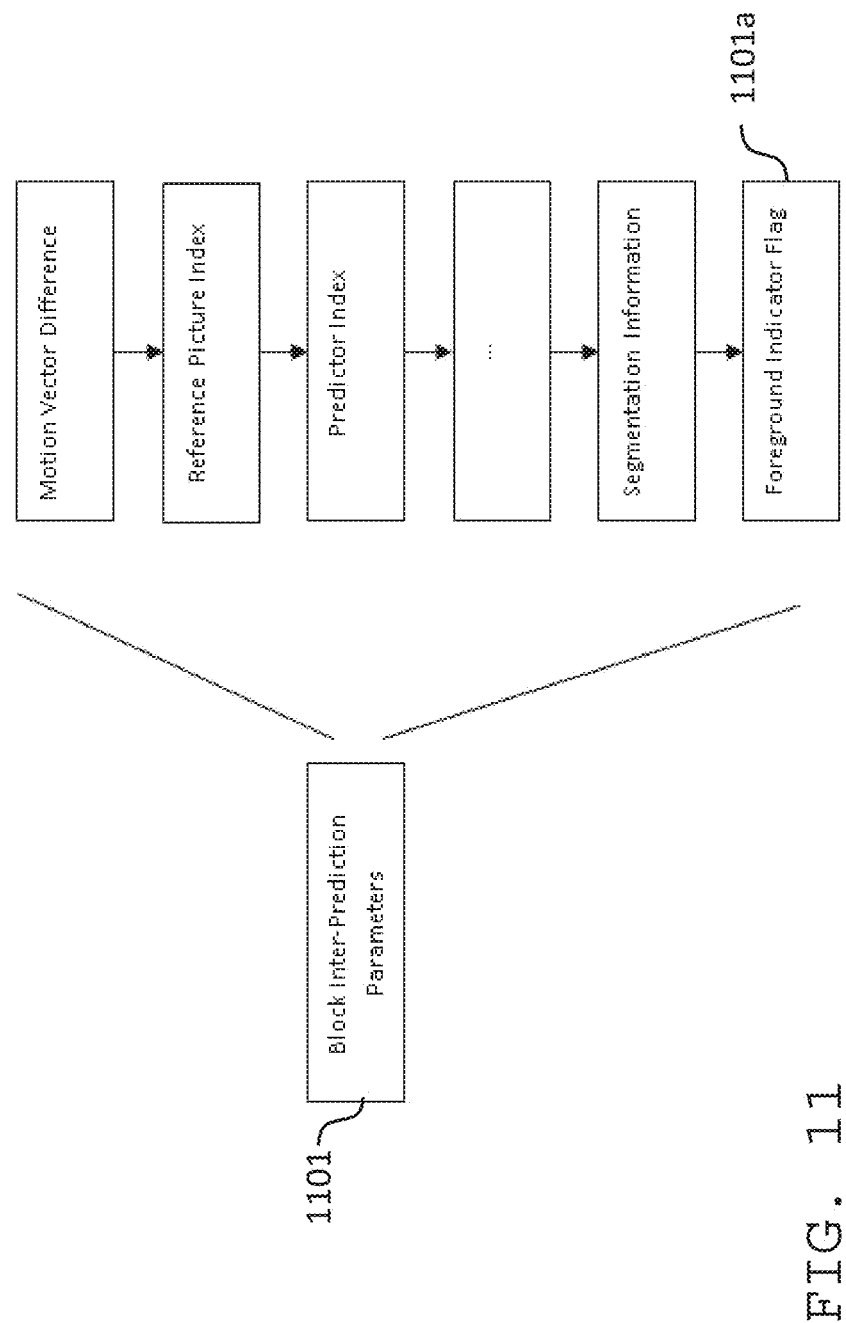
FIG. 11 shows a schematic diagram illustrating different aspects implemented in an encoding apparatus and a decoding apparatus according to an embodiment.

In an embodiment, the feathering filtering is performed into the direction of the background segment, which can be signalled to the decoding apparatus 200 via an additional flag. As the segmentation process may result in an arbitrary assignment of the foreground object to $S_0$ or $S_1$, this ambiguity can be solved by indicating whether $S_0$ or $S_1$ is actually the foreground. FIG. 11 shows an exemplary implementation, where this indicator flag 1101a is passed along the inter-prediction related coding information or side information, including block-related information such as the segment motion vectors and the segmentation information. The indicator flag 1101a can therefore be part of the block-related information 1101 and can be signalled at the coding-unit level.

Furthermore, signaling of the indicator flag 1101 a can be implemented by making use of context-adaption, e.g. choosing a context for a context-adaptive arithmetic encoder, which adapts to the shape of segment based partitioning.

While a particular feature or aspect of the disclosure may have been disclosed with respect to only one of several implementations or embodiments, such feature or aspect may be combined with one or more other features or aspects of the other implementations or embodiments as may be desired and advantageous for any given or particular application. Furthermore, to the extent that the terms "include", "have", "with", or other variants thereof are used in either the detailed description or the claims, such terms are intended to be inclusive in a manner similar to the term "comprise". Also, the terms "exemplary", "for example" and "e.g." are merely meant as an example, rather than the best or optimal. The terms "coupled" and "connected", along with derivatives may have been used. It should be understood that these terms may have been used to indicate that two elements cooperate or interact with each other regardless whether they are in direct physical or electrical contact, or they are not in direct contact with each other.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

Many alternatives, modifications, and variations will be apparent to those skilled in the art in light of the above teachings. Of course, those skilled in the art readily recognize that there are numerous applications of the disclosure beyond those described herein. While embodiments of the present disclosure have been described with reference to one or more particular embodiments, those skilled in the art recognize that many changes may be made thereto without departing from the scope of the present disclosure. It is therefore to be understood that within the scope of the appended claims and their equivalents, the disclosure may be practiced otherwise than as described herein.

The invention claimed is:

1. A decoding apparatus for decoding a video coding block of an encoded video signal comprising coding information and a plurality of frames wherein the decoding apparatus comprises:
   a memory configured to store instructions; and
   a processor coupled to the memory, wherein the instructions cause the processor to be configured to:
      decode the video coding block of a current frame of the plurality of frames to provide a residual video coding block, wherein each of the plurality of frames is dividable into a plurality of video coding blocks;
      partition the video coding block on the basis of the coding information into two or more segments including a first segment and a second segment, wherein the coding information comprises a first segment motion vector and a second segment motion vector, wherein the first segment motion vector is associated with the first segment and the second segment motion vector is associated with the second segment;
      determine a co-located first segment in a first reference frame on the basis of the first segment motion vector;
      determine a co-located second segment in a second reference frame on the basis of the second segment motion vector;
      generate a predicted video coding block on the basis of the co-located first segment and the co-located second segment, wherein the predicted video coding block comprises a predicted first segment and a predicted second segment;
      determine a divergence measure on the basis of the first segment motion vector and the second segment motion vector, wherein the divergence measure indicates either a divergence of the first segment motion vector and the second segment motion vector or a convergence of the first segment motion vector and the second segment motion vector;
      apply either a first filter to the predicted video coding block or a second filter to the predicted video coding block based on the divergence measure to obtain a filtered predicted video coding block; and
      reconstruct the video coding block on the basis of the filtered predicted video coding block and the residual video coding block.

2. The decoding apparatus of claim 1, wherein the processor is configured to apply the first filter to a boundary between the predicted first segment and the predicted second segment when the divergence measure indicates the first segment motion vector is diverging and the second segment motion vector is diverging, wherein the first filter comprises a directional smoothing filter configured to smooth across the boundary between the predicted first segment and the predicted second segment.

3. The decoding apparatus of claim 2, wherein the processor is configured to:
   adjust a filter property of the first filter on the basis of the divergence measure;
   adjust the filter property of the first filter on the basis of the first segment motion vector and the second segment motion vector; or
   adjust the filter property of the first filter on the basis of a difference between pixel values of pixels located at the boundary between the predicted first segment and the predicted second segment, wherein the filter property of the first filter comprises a first filter strength or a first filter size of the first filter.

4. The decoding apparatus of claim 1, wherein the processor is further configured to determine whether the predicted first segment or the predicted second segment is a background segment on the basis of the coding information, wherein the coding information further comprises information indicating whether the predicted first segment or the predicted second segment is a background segment or a foreground segment.

5. The decoding apparatus of claim 4, wherein the processor is configured to apply the second filter to the predicted video coding block when the divergence measure indicates the first segment motion vector is converging and the second segment motion vector is converging, wherein the second filter comprises a feathering filter configured to either feather in a direction of the background segment or feather in an opposite direction to the foreground segment.

6. The decoding apparatus of claim 4, wherein the processor is further configured to adjust a filter property of the second filter on the basis of the divergence measure, wherein the filter property of the second filter comprises either a second filter strength of the second filter or a second filter size of the second filter.

7. The decoding apparatus of claim 1, wherein the first segment motion vector and the second segment motion vector form a vector field, wherein the processor is configured to determine the divergence measure as the divergence of the vector field, wherein the divergence of the vector field being smaller than a first threshold indicates the first segment motion vector and the second segment motion vector are converging, and wherein the divergence of the vector field being larger than the first threshold indicates the first segment motion vector and the second segment motion vector are diverging.

8. A method for decoding a video coding block of an encoded video signal comprising coding information and a plurality of frames, wherein the method comprises:
  decoding the video coding block of a current frame of the plurality of frames to provide a residual video coding block, wherein each of the plurality of frames is dividable into a plurality of video coding blocks;
  partitioning the video coding block on the basis of the coding information into two or more segments including a first segment and a second segment, wherein the coding information comprises a first segment motion vector and a second segment motion vector, wherein the first segment motion vector is associated with the first segment and the second segment motion vector is associated with the second segment;
  determining a co-located first segment in a first reference frame on the basis of the first segment motion vector;
  determining a co-located second segment in a second reference frame on the basis of the second segment motion vector;
  generating a predicted video coding block on the basis of the co-located first segment and the co-located second segment, wherein the predicted video coding block comprises a predicted first segment and a predicted second segment;
  determining a divergence measure on the basis of the first segment motion vector and the second segment motion vector, wherein the divergence measure indicates either a divergence of the first segment motion vector and the second segment motion vector or a convergence of the first segment motion vector and the second segment motion vector;
  applying either a first filter to the predicted video coding block or a second filter to the predicted video coding block based the divergence measure to obtain a filtered predicted video coding block; and
  reconstructing the video coding block on the basis of the filtered predicted video coding block and the residual video coding block.

9. The decoding method of claim 8, wherein the applying comprises applying the first filter to a boundary between the predicted first segment and the predicted second segment of the predicted video coding block when the divergence measure indicates the first segment motion vector is diverging and the second segment motion vector is diverging, wherein the first filter comprises a directional smoothing filter for smoothing across the boundary between the predicted first segment and the predicted second segment.

10. The decoding method of claim 8, wherein the decoding comprises determining, on the basis of the coding information, whether the predicted first segment is a background segment or whether the predicted second segment is a background segment, wherein the coding information further comprises information indicating whether the predicted first segment is a background segment or a foreground segment or indicating whether the predicted second segment is a background segment or a foreground segment.

11. The decoding method of claim 10, wherein the applying comprises applying the second filter to the predicted video coding block when the divergence measure indicates the first segment motion vector is converging and the second segment motion vector is converging, wherein the second filter comprises a feathering filter for either feathering in a direction of the background segment or feathering in an opposite direction to the foreground segment.

12. An encoding apparatus for encoding a video coding block of a video signal comprising a plurality of frames, wherein the encoding apparatus comprises:
  a memory configured to store instructions; and
  a processor coupled to the memory, wherein the instructions cause the processor to be configured to:
    partition the video coding block into two or more segments including a first segment and a second segment;
    determine a co-located first segment in a first reference frame of the video signal;
    determine a co-located second segment in a second reference frame of the video signal, wherein each of the first segment and the co-located first segment comprise a first segment motion vector, wherein each of the second segment and the co-located second segment comprise a second segment motion vector;
    generate a predicted video coding block on the basis of the co-located first segment and the co-located second segment, wherein the predicted video coding block comprises a predicted first segment and a predicted second segment;
    determine a divergence measure on the basis of the first segment motion vector and the second segment motion vector, wherein the divergence measure indicates either a divergence of the first segment motion vector and the second segment motion vector or a convergence of the first segment motion vector and the second segment motion vector;
    apply either a first filter to the predicted video coding block or a second filter to the predicted video coding block based on the divergence measure; and
    generate an encoded video coding block on the basis of the filtered predicted video coding block.

13. The encoding apparatus of claim 12, wherein the processor is further configured to apply the first filter to a boundary between the predicted first segment and the predicted second segment of the predicted video coding block when the divergence measure indicates the first segment motion vector and the second segment motion vector are diverging, wherein the first filter comprises a directional smoothing filter configured to smooth across the boundary between the predicted first segment and the predicted second segment.

14. The encoding apparatus of claim 13, wherein the processor is further configured to:
  adjust a filter property of the first filter on the basis of the divergence measure;
  adjust the filter property of the first filter on the basis of the first segment motion vector and the second segment motion vector; or
  adjust the filter property of the first filter on the basis of a difference between pixel values of pixels located at the boundary between the predicted first segment and the predicted second segment, wherein the filter property of the first filter comprises a first filter strength or a first filter size of the first filter.

15. The encoding apparatus of claim 12, wherein the processor is further configured to determine whether the predicted first segment or the predicted second segment is either a background segment or a foreground segment.

16. The encoding apparatus of claim 15, wherein the processor is further configured to apply the second filter to the predicted video coding block when the divergence measure indicates the first segment motion vector and the second segment motion vector are converging, wherein the second filter comprises a feathering filter configured to either feather in a direction of the background segment or feather in an opposite direction to the foreground segment.

17. The encoding apparatus of claim 15, wherein the processor is further configured to adjust a filter property of the second filter on the basis of the divergence measure, wherein the filter property of the second filter comprises either a second filter strength or a second filter size of the second filter.

18. The encoding apparatus of claim 12, wherein the processor is further configured to:
encode information in an encoded video signal indicating whether the predicted first segment or the predicted second segment is the background segment; or
encode information in an encoded video signal indicating whether the predicted first segment or the predicted second segment is the foreground segment.

19. The encoding apparatus of claim 12, wherein the first segment motion vector and the second segment motion vector form a vector field, wherein the processor is further configured to determine the divergence measure as the divergence of the vector field, wherein the divergence of the vector field being smaller than a first threshold indicates the first segment motion vector and the second segment motion vector are converging, and wherein the divergence of the vector field being larger than the first threshold indicates the first segment motion vector and the second segment motion vector are diverging.

20. The encoding apparatus of claim 12, wherein the processor is further configured to:
shift a boundary between the predicted first segment and the predicted second segment on the basis of a boundary shift vector associated with the boundary; and
apply either the first filter or the second filter to the shifted boundary between the predicted first segment and the predicted second segment based on the divergence measure.

21. The encoding apparatus of claim 20, wherein the processor is further configured to determine the boundary shift vector on the basis of a distortion measure between the video coding block and the predicted video coding block.

22. The encoding apparatus of claim 20, wherein the processor is further configured to determine the boundary shift vector from a set of candidate boundary shift vectors, wherein the candidate boundary shift vectors are smaller than or equal to a difference vector between the first segment motion vector and the second segment motion vector.

* * * * *